(12) United States Patent
Hawthorne

(10) Patent No.: US 9,834,464 B1
(45) Date of Patent: Dec. 5, 2017

(54) FRACTAL SYSTEM FOR RECURSIVE SEPARATION OF CONTAMINANTS FROM A FLOWABLE MEDIUM

(71) Applicant: Namon A. Hawthorne, Miami, OK (US)

(72) Inventor: Namon A. Hawthorne, Miami, OK (US)

( * ) Notice: Subject to any disclaimer, the term of this patent is extended or adjusted under 35 U.S.C. 154(b) by 0 days.

(21) Appl. No.: 15/330,379

(22) Filed: Sep. 12, 2016

(51) Int. Cl.
| | |
|---|---|
| *C02F 1/42* | (2006.01) |
| *C02F 9/00* | (2006.01) |
| *C02F 101/10* | (2006.01) |
| *C02F 103/08* | (2006.01) |
| *C02F 1/46* | (2006.01) |
| *C02F 101/00* | (2006.01) |

(52) U.S. Cl.
CPC .......... *C02F 9/00* (2013.01); *C02F 1/42* (2013.01); *C02F 1/4604* (2013.01); *C02F 2001/422* (2013.01); *C02F 2001/425* (2013.01); *C02F 2101/006* (2013.01); *C02F 2101/10* (2013.01); *C02F 2103/08* (2013.01)

(58) Field of Classification Search
CPC ...... C02F 1/42; C02F 1/32; C02F 1/38; C02F 1/46; B07B 7/00; C07K 1/26; G01N 27/00; B03C 1/02; B01D 31/00
See application file for complete search history.

(56) References Cited

U.S. PATENT DOCUMENTS

2016/0115062 A1* 4/2016 Krieger .................. C02F 9/00
                                                                210/241

* cited by examiner

*Primary Examiner* — Walter D Griffin
*Assistant Examiner* — Cameron Allen
(74) *Attorney, Agent, or Firm* — Michael Hetherington, Attorney at Law

(57) ABSTRACT

A recursive fractal system provides low cost, high throughput removal of contaminants, selected compounds, and elements from a flowable medium. This includes low energy desalination of saltwater, and removal contaminants from waste water. A series of concatenated, self-similar, coaxially aligned fractal stages are provided for defining a flow path for receiving the flowable medium, such as salt water. The configuration of self similar fractal stages as a succession of venturis recursively accelerates and separates flow vectors at each stage without the need for pumping. The series of venturis have been found to accelerate the water to such an extent that an electro hydrodynamic field interaction is magnified at each successive stage, such that contaminants, heavy metals, salt, or other selected compounds are aggregated by an electromagnetic field signature, separated and extracted from the flowable medium.

7 Claims, 10 Drawing Sheets

FRACTAL SYSTEM FOR RECURSIVE SEPARATION OF CONTAMINANTS FROM A FLOWABLE MEDIUM

CROSS REFERENCE TO RELATED APPLICATION

This patent application claims the benefit of U.S. Provisional Application 62/283,780, filed Sep. 11, 2015.

BACKGROUND

Field of the Invention

The field of the invention generally relates to a recursive fractal system for low cost, high throughput removal of contaminants, selected compounds, and elements from a flowable medium. This includes desalination of saltwater, removing contaminants from waste water, and suppressing radioactivity in water in need of radioactive remediation.

More particularly, the field of the invention relates to a series of concatenated, self-similar, co-axially aligned fractal stages for defining a flow path for receiving a flowable medium, and that recursively accelerate and separate flow vectors, and magnify an electro hydrodynamic field interaction at each stage, such that contaminants, heavy metals, salt, or other selected compounds are aggregated by an electromagnetic field signature, separated and extracted from the flowable medium.

A continuous flow ion exchange resin system receives output flow of positively charged water from the terminal stage of serially connected fractal stages and directs the flow of water oppositely over and against alternating continuous flows of anion and cation resins. This has the effect of further cleaning and separating the charged water of salt, heavy metals and other contaminants.

In the practice of the invention, using salt water as the flowable medium, it is found that recursive acceleration, reduction of pressure, and separation of the flowable medium at each self-similar fractal/venturi stage creates a strong electro-hydrodynamic interaction between the accelerating flow and the square venturi walls. Recursive magnification of the electro-hydrodynamic interaction at each self-similar fractal stage in turn imposes an increasingly powerful electro-hydrodynamic field on molecules in the salt water flow path through each stage that ultimately results in molecular separation of salt and other contaminants by specific gravity and electromagnetic field signature.

The fractal scaling of the flow path through the serially connected, self-similar venturi stages has been found to create a strong electro-hydrodynamic field that imposes a positive charge on salt water in the flow path, and is sufficient to break the strong force interaction and separate NaCl molecular bonds, as well as to affect molecular and radiation interactions at the atomic level. Please refer to third party Test Results appended to the Drawings as Table 1.

The system is characterized by low energy consumption, no moving parts in the fractal process chamber/reactor, and high conversion efficiency. Substantially all salt water processed through the system is converted to fresh drinking water. There is no brine waste or need for back flushing. Water is not heated, and no chemicals are added. Pathogens such as bacteria and virus are completely destroyed by removal of electrons. This cleansing action is similar to the disinfecting action of chlorine, but advantageously eliminates the disadvantages of adding chlorine to water.

BACKGROUND OF RELATED ART

Access to fresh water for drinking and agriculture is a fundamental need that increasingly conflicts with freshwater demands for industrial processes, agriculture, and hydroelectric energy production. Conventional methods for transporting fresh water from areas of surplus to areas of need, or for producing fresh water via desalination tend to be highly demanding of scarce supplies of affordable energy. For example, the Central Valley Water Project, Edmonston pumping station for moving water over the the Tehachapi Mountains to Los Angeles is the biggest user of electricity in California.

Accordingly, there is a need for cost effective, large scale recovery and conversion of ocean or brackish water to safe fresh water to ensure a sustainable, safe freshwater supply going forward.

Disadvantages of Conventional Methods of Desalination

A conventional desalination process essentially separates saline water into two parts—one that has a low concentration of salt (treated water or product water), and the other with a much higher concentration than the original feed water, usually referred to as brine concentrate or simply as "concentrate."

The two major types of conventional technologies that are used for desalination can be classified broadly as either thermal or membrane. Both technologies need a considerable amount of energy to operate and produce fresh water. Within those two broad types, there are sub-categories (processes) using different techniques. Thermal and membrane capacity on a worldwide basis was about 7 billion gallons per day (bgd) in early 2000, with about 50% in thermal processes and 50% in membrane technologies. On a global basis, desalination capacity increased at almost 12 percent per year, from 1972 through 1999. There have been over 8,600 desalination plants installed worldwide, with approximately 20 percent of them in the U.S., the largest number of any country in the world. In terms of capacity however, the U.S. ranks second globally (U.S. Department of the Interior, 2003).

Thermal Technology

Thermal technologies involve heating of saline water and collecting the condensed vapor (distillate) to produce pure water. Thermal technologies rarely have been used for brackish water desalination, because of the high energy costs involved. They have however been used for seawater desalination and can be sub-divided into three groups: Multi-Stage Flash Distillation (MSF), Multi-Effect Distillation (MED), and Vapor Compression Distillation (VCD).

Multi-Stage Flash Distillation (MSF)

This process involves the use of distillation through several (multi-stage) chambers. In the MSF process, each successive stage of the plant operates at progressively lower pressures. The feed water is first heated under high pressure, and is led into the first 'flash chamber', where the pressure is released, causing the water to boil rapidly resulting in sudden evaporation or "flashing." Such flashing of a portion of the feed continues in each successive stage, because the pressure at each stage is lower than in the previous stage. The vapor generated by the flashing is converted into fresh water by being condensed on heat exchanger tubing at through each stage. The tubes are cooled by the incoming cooler feed water. Generally, only a small percentage of the feed water is converted into vapor and condensed.

Multi-stage flash distillation plants have been built since the late 1950s. Some MSF plants can contain from 15 to 25 stages, but are usually no larger than 15 mgd in capacity. MSF distillation plants can have either a 'once-through' or 'recycled' process. In the 'once-through' design, the feed water is passed through the heater and flash chambers just once and disposed of, while in the recycled design, the feed water for cooling is recycled. Each of these processes can be structured as a 'long tube' or 'cross tube' design. In the long tube design (built at Freeport in 1961), tubing is parallel to the concentrate flow, while in the cross tube design, tubing is perpendicular to the concentrate flow.

MSF plants are subject to corrosion unless stainless steel is used extensively. In addition to corrosion, MSF plants are also subject to erosion and impingement attack (U.S. Bureau of Reclamation, 2003). Erosion is caused by the turbulence of the feed water in the flash chamber, when the feed water passes from one stage to another.

Distillation processes produce about 3.4 billion gpd globally, which is about 50 percent of the worldwide desalination capacity. MSF plants provide about 84 percent of that capacity. Most of those plants have been built overseas, primarily in the Middle East, where energy resources have been plentiful and inexpensive.

Multi-Effect Distillation (MED)

The MED process has been used since the late 1950s and early 1960s. Multi-effect distillation occurs in a series of vessels (effects) and uses the principles of evaporation and condensation at reduced ambient pressure. In MED, a series of evaporator effects produce water at progressively lower pressures. Water boils at lower temperatures as pressure decreases, so the water vapor of the first vessel or effect serves as the heating medium for the second, and so on. The more vessels or effects there are, the higher the performance ratio. Depending upon the arrangement of the heat exchanger tubing, MED units could be classified as horizontal tube, vertical tube or vertically stacked tube bundles There are several MED plants in the U.S. and overseas. Three low-temperature MED plants with a combined capacity of 3.5 mgd have been operating successfully in St. Thomas, U.S. Virgin Islands, where desalinated water is the principal water supply source. Steam from the power plant is directed to the evaporators in the desalination units. Product water is obtained as condensate of the vapor from each vessel.

Vapor Compression Distillation

The vapor compression distillation (VCD) process is used either in combination with other processes such as the MED, or by itself. The heat for evaporating the water comes from the compression of vapor, rather than the direct exchange of heat from steam produced in a boiler. Vapor compression (VC) units have been built in a variety of configurations. Usually, a mechanical compressor is used to generate the heat for evaporation. The VC units generally are limited in capacity, and are often used at hotels, resorts and in industrial applications.

Membrane Technology

Membrane based technologies can be subdivided into two broad categories: Electro-dialysis/Electro-dialysis Reversal (ED/EDR), and Reverse Osmosis (RO) and nano-filtration.

Electro-Dialysis (ED) and Electro-Dialysis Reversal (EDR)

Electro-dialysis (ED) is a voltage-driven membrane process. An electrical potential is used to move salts through a membrane, leaving fresh water behind as product water. ED was commercially introduced in the 1960s, about 10 years before reverse osmosis (RO), Although ED was originally conceived as a seawater desalination process, it has generally been used for brackish water desalination.

ED depends on the following general principles:
1. Most salts dissolved in water are ions, either positively charged (cations), or negatively charged (anions).
2. Since like poles repel each other and unlike poles attract, the ions migrate toward the electrodes with an opposite electric charge.
3. Suitable membranes can be constructed to permit selective passage of either anions or cations.

In a saline solution, dissolved ions such as sodium (+) and chloride (−) migrate to the opposite electrodes passing through selected membranes that either allow cations or anions to pass through (not both). Membranes are usually arranged in an alternate pattern, with anion-selective membrane followed by a cation-selective membrane. During this process, the salt content of the water channel is diluted, while concentrated solutions are formed at the electrodes. Concentrated and diluted solutions are created in the spaces between the alternating membranes, and these spaces bound by two membranes are called cells. ED units consist of several hundred cells bound together with electrodes, referred to as a stack. Feed water passes through all the cells simultaneously to provide a continuous flow of desalinated water and a steady stream of concentrate (brine) from the stack.

The Electro-dialysis Reversal (EDR) process was introduced In the early 1970s, An EDR unit operates on the same general principle as an ED unit, except that both the product and concentrate channels are identical in construction. At intervals of several times an hour, the polarity of the electrodes is reversed, causing ions to be attracted in the opposite direction across the membranes. Immediately following reversal, the product water is removed until the lines are flushed out and desired water quality restored. The flush takes a few minutes before resuming water production. The reversal process is useful in breaking up and flushing out scale, slime, and other deposits in the cells before they build up. Flushing helps in reducing the problem of membrane fouling.

Because of the inherent characteristics of the electrical process used in ED units, they are normally used to desalinate brackish water, rather than high salinity water such as seawater. The few ED units that are located in Texas are those that are used in low-salinity applications such as surface water desalination.

Reverse Osmosis (RO) and Nano Filtration (NF)

In relation to thermal processes, Reverse Osmosis (RO) is a relatively new process that was commercialized in the 1970s. Currently, RO is the most widely used method for desalination in the United States. The RO process uses pressure as the driving force to push saline water through a semi-permeable membrane into a product water stream and a concentrated brine stream. Nano filtration (NF) is also a membrane process that is used for removal of divalent salt ions such as Calcium, Magnesium, and Sulphate. RO, on the other hand, is used for removal of Sodium and Chloride. RO processes are used for desalinating brackish water (TDS>1, 500 mg/l), and seawater as explained below.

Osmosis is a natural phenomenon by which water from a low salt concentration passes into a more concentrated solution through a semi-permeable membrane. When pressure is applied to the solution with the higher salt concentration solution, the water will flow in a reverse direction through the semi-permeable membrane, leaving the salt behind. This is known as the Reverse Osmosis process or RO process.

An RO desalination plant essentially consists of four major systems:
1. A pre-treatment system; 2. High-pressure pumps; 3. Membrane systems; 4. Post-treatment.

Pre-treatment is very important in RO because the membrane surfaces must remain clean. Therefore, all suspended solids first must be removed, and the water pre-treated so that salt precipitation or microbial growth does not occur on the membranes. Pre-treatment may involve conventional methods such as a chemical feed followed by coagulation, flocculation, sedimentation, and sand filtration. Alternatively, pre-treatment may involve membrane processes such as microfiltration (MF) and ultrafiltration (UF). The choice of a particular pre-treatment process is based on a number of factors such as feed water quality characteristics, space availability, RO membrane requirements and other factors. A pre-treatment process is disadvantageously time consuming. Pre-treatment chemicals are expensive, and may be environmentally harmful.

High pressure pumps supply the pressure needed to enable the water to pass through the membrane and have the salt rejected. The pressures range from about 150 psi for slightly brackish water to 800-1,000 psi for seawater.

The membrane assembly consists of a pressure vessel and a semi-permeable membrane inside that permits the feed water to pass through it. RO membranes for desalination generally come in two types: Spiral wound and Hollow fiber. Spiral wound elements are actually constructed from flat sheet membranes. Membrane materials may be made of cellulose acetate or of other composite polymers. In the spiral wound design, the membrane envelope is wrapped around a central collecting tube. The feed water under pressure flows in a spiral path within the membrane envelope, and pure (desalinated) water is collected in the central tube. As a portion of the water passes through the membrane, the remaining feed water increases in salt content. A portion of the feed water is discharged without passing through the membrane. Without this discharge, the pressurized feed water would continue to increase in salinity content, causing super-saturation of salts. The amount of feed water that is discharged as concentrate ranges from about 20 percent for brackish water to about 50 percent for seawater.

Under pressure, desalinated water passes through the fiber walls, and flows in the hollow fibers for collection. This type of design is not as widely used now as the spiral wound membranes for desalination.

Post-Treatment consists of stabilizing the water and preparing it for distribution. The post-treatment might consist of adjusting the pH and disinfection. If the desalinated water is to be combined with other sources of water supply, it is very important to ensure similar water quality characteristics in both water sources.

Two developments have helped to reduce the operating cost of RO plants during the past decade: the development of more efficient membranes and the use of energy recovery devices. The newer membranes have higher flux (rate of water flow per unit area), improved rejection of salts, lower prices and longer service life.

It is now common to use energy recovery devices connected to the concentrate stream as it leaves the pressure vessel at about 20-50 psi less than the applied pressure from the high-pressure pump. The energy recovery devices are mechanical and consist of turbines, pressure exchangers or other devices that rotate and produce energy, thus assisting the RO process in reducing the overall energy needs. The energy recovered can be as high as 25-35 percent of the input energy for seawater RO.

Reverse osmosis requires back flushing of the membranes and expends about four or five gallons of waste water for every gallon of fresh water produced, including considerable brine waste that degrades the marine environment. This renders reverse osmosis disadvantageously energy intensive, wasteful, and too environmentally harmful to be a cost effective solution for sea water purification. Large scale RO plants are disadvantageously capital intensive, and typically cover many acres and even square miles of valuable shoreline and estuary habitat, blocking public and wildlife access to water.

Ion Exchange System for Treatment of Desalinated Water

Ion exchange resins are well-known for removing contaminants from drinking water, and for treating desalinated water. Ion exchange resins are insoluble substances containing loosely held ions that are able to be exchanged with other ions in solutions that come in contact with the resins. These exchanges take place without any physical alteration to the ion exchange material. Ion exchangers are insoluble acids or bases containing salts that are also insoluble. This enables resins to exchange either positively charged ions (cation exchangers) or negatively charged ones (anion exchangers).

The resins typically comprise spherical beads 0.5 to 1.0 mm in diameter. These appear solid even under the microscope, but on a molecular scale the structure is open. Typically a solution to be cleaned is passed down a resin bed in non-resistive flow, such that the solution flows through a cross-linked polymer, bringing it into contact with the exchange sites. A bed of resin can be used either to remove unwanted ions from a solution passed through it or to accumulate a valuable mineral from the water that can be recovered from the resin. Examples of the removal of unwanted ions are the removal of heavy metals from water.

Disadvantages of Conventional Ion Exchange Systems

For ion exchange to be efficient there must be a difference in affinity between the ion in the resin and the ion or ions to be removed from solution. The resin must have a higher affinity for the ion in solution compared to the ion in the resin.

Conventional ion exchange technology is a preferred solution for removing or exchanging contaminants present in low concentrations. In such a case, the running time until the resin column is exhausted can be very long, ranging from a few hours to several months.

When, as in the case of seawater desalination, the concentration of contaminants is high, conventional ion exchange cycles become exceedingly short and the quantity of regenerants increases to uneconomical levels. In the case of brackish water (underground water with high salinity as often found in arid countries) or sea water, ion exchange is not suitable and other technologies must be used.

Therefore, what is needed is a ion exchange system that does not clog, prolongs resin life, and can be used as a cost-effective solution to increase output of treated, desalinated water.

Energy of Conventional Desalination

Despite attempts to refine and combine the foregoing conventional methods of desalination, the energy requirements are still tremendous. State-of-the-art desalination disadvantageously requires 7 to 30 kW-h of energy per 1000 gallons of desalinated water. The energy required can vary significantly based on the type of desalination used as well as the initial salt content of the water.

Thus, to desalinate 12 billion gallons of water daily requires at least 84 million kW-h of energy; the actual number is likely significantly higher as many plants use older technology that requires more energy per 1000 gallons of purified water. Since a gallon of gasoline contains about 33 kW-h, desalination systems worldwide require the equivalent of at least 2.5 million gallons of gasoline daily to desalinate water.

As world population continues to grow, the existing fresh water supply will become increasingly inadequate. As more and more water is required to meet competing needs of industry, agriculture and municipalities for safe drinking water, desalination of ocean water will become a critically important source of potable water.

Therefore, what is also needed is a cost effective, energy efficient system for large scale desalination that reduces waste, minimizes ecologic impact and is compatible with responsible development of increasingly scarce and valuable shoreline and estuary habitat

SUMMARY

In order to overcome the above-described disadvantages of conventional desalination systems, an aspect of the invention converts substantially all of the input salt water to drinkable fresh water. There is no brine waste; salt is reduced to sodium and chloride. Sodium is congealed and extracted as a powder, and chloride is gasified. Input water is not heated, nor treated with chemicals. Pathogens such as virus and bacteria are destroyed by stripping them of electrons, similar to the cleansing action of chlorine. Over 90 percent of the input water is recovered as fresh water. In contrast, reverse osmosis (RO) wastes four to five gallons of water for each gallon of fresh water produced. RO produces unacceptable brine waste that is deleterious to marine habitat.

In accordance with another aspect of the invention, capital equipment and operating costs are extremely low, approximately ⅛ compared to a conventional membrane or thermal based desalination system. In the invention, the intake pumps and resin circulation pumps require only 240 volts, three-phase, and easily can be run by a generator when utility power is not available. There are no moving parts other than an input pump, and pump for circulation of the resins.

Mobile Application with Small Form Factor

Another aspect of the invention employs a modular, small form factor, mobile desalination system that can be mounted on a 40 foot trailer, towed by a truck.

The invention is scalable, enabling units of different sizes to operate singly or in parallel. For example, an experimental unit capable of processing 2500 gallons per minute (gpm) of saltwater into fresh drinking water can be integrated on a single 40 foot long trailer and pulled into place by a truck. Four trailers, each integrated with a 2500 gpm unit can be pulled into place and operated in tandem, thereby producing 10,000 gallons of fresh drinking water per minute, or 14.4 million gallons of drinking water per day. For further comparison, 24 2500 gpm units operating in sets of 4 would be capable of producing 14.4×6 or 86.4 million gallons per day—at approximately ⅛ of the capital and operating cost of an equivalent RO unit, and with no brine waste, heating of output water, or any deleterious effect on the aquatic environment.

The invention is scalable, in terms of processing capacity, to any convenient size or multiples of machines operating in tandem. Such scalability, modular construction, small form factor, and ease of transport may facilitate rapid deployment and provide a viable, cost effective solution to a drought condition, such as exists in many regions of the Western United States.

Subsurface Screened Intake

In another aspect, horizontal well drilling techniques are employed to provide one or more subsurface transport conduits for pumping salt water from a saturated, water permeable zone beneath the sand or seabed at a desired distance up to four miles or more removed from the ocean or estuary shoreline. Subsurface conduits are provided with slotted or screened intake ends, such as are well known for water wells, to prevent ingress of aquatic life, and preserve the shoreline habitat.

Fractal Flowpath for Recursive Processing of a Flowable Medium

Another aspect of the invention, utilizes a plurality of successive, self-similar fractal stages for defining a fractal flow path for receiving a flowable medium, such as salt water, or other undrinkable, non-potable, polluted water. The self-similar fracatal stages recursively process, at each fractal stage, a quantity of flowable medium. The term, self-similar fractal stage, is used herein to refer to a selected geometric construction, such as a series of inter fitted, concatenated square pyramidal cones, [FIG. 2A]. The stages are geometrically the same at any scale and are said to be scale invariant or self similar. The fractal stages are self similar in that they cascade from an initiator or starting construction [size and shape] to an ending size and shape in a progressive manner according to a fractal scaling rule. In a preferred embodiment, the fractal scaling rule is $\hat{\omega}$, Phi=1.168. Each fractal stage is a scaled copy of the initiator.

An energy generating basis of the plurality of fractal stages comprises a recursive pressure, vertical velocity interaction between the stages and the flowable medium that ultimately generates a mechanism for recursive energy transfer between the flowable medium (salt water) and the self similar fractal stages. The energy of the flowable medium through the fractal flowpath is recursively magnified at each stage Each successive, self-similar, fractal stage recursively imposes an electro-hydrodynamic field that has a number of fractal electrical frequencies influencing the water flowing through each stage. These frequencies extract electrons simultaneously from chemical elements dissolved in the flowable medium. The electro-hydrodynamic field is magnified recursively at each stage according to fractal power laws.

As used herein, iteration is a subset of recursion. Iteration implies a repeated application of the fractal scaling rule to successive results. As used herein, a recursive function relates to the magnified result of a plurality of successive iterations. Recursion and iteration imply the same operation carried out repeatedly at each fractal stage, such that the processed output water of a first or upstream fractal stage becomes the input water for each successive iteration of the fractal scaling rule at each corresponding downstream stage along the fractal flow path.

Each fractal stage comprises: an input for receiving a flowable medium for processing; a body characterized by a desired geometric shape defining a flowpath for processing the flowable medium received through the input; and an output for providing processed flowable medium to the input of an adjacent downstream fractal stage for a successive processing iteration. In this regard, each fractal stage recursively processes the output water processed by a previous stage.

In practice of the invention, each fractal stage has been found to magnify recursively a strong electro-hydrodynamic field and positive charge on the water flowing through each fractal stage. Each iteration of flow at a successive stage represents a logarithmically increasing electro-hydrodynamic field at each stage going forward in time.

It has been found that by approximately the third stage the recursive processing of water at each stage has broken the NaCl bonds and removed most of the salt. By recursively magnifying the electro=hydrodynamic field at each stage, output water from the final stage in the fractal flow path becomes highly positively charged.

Continuous Flow Resin System

According to another aspect of the invention, a plurality of ion exchange resins are employed in a continuous flow configuration, through alternating ion exchange containment vessels or canisters containing alternately cation (+) and anion (−) resin beads to further clean the flow path of water processed from the fractal stages. The plurality of cation and anion resin beads are circulated by means of separate pumps through corresponding cation and anion canisters arranged in an alternating configuratio that. defines a continuous ion exchange flow path. Each ion exchange canister defines a first flowpath characterized by a continuous flow of either cation or anion resins in a first direction. Each cation and anion canister also defines a second flowpath for throughput water from the fractal stages, in a second direction, opposite the flow of resins. That is, corresponding cation and anion canisters define flow paths for ion exchange resins, that are directionally opposite and against the flow of throughput water flowing through the canisters in the opposite direction over and against the flow of resins.

This arrangement advantageously provides a continuous flow resin extraction process that magnifies the ion exchange process by interposing flowpaths of processed water and ions in resistive flow, over and against each other for maximum surface interaction and ionic exchange.

Most resins are economically efficient only when the total dissolved solids (TDS) of a solution are about 3,000 ppm or less. Since the TDS in practice can exceed 120,000 ppm in many saltwater operations, such as in petroleum production water, resins must be capable of continually extracting the targeted element at an acceptable operational production rate.

This aspect of the invention advantageously provides a previously unattainable high production capability in a very cost effective manner. In practice of the invention, this also has been found to prolong the operational life of the resins and to reduce radioactively contaminated water back to environmentally safe background levels.

BRIEF DESCRIPTION OF THE DRAWINGS

The drawings are heuristic for clarity. The forgoing and other features and advantages of the invention will be appreciated from the following drawings and detailed description wherein.

Table 1 shows experimental test results in practice of the invention, comparing output levels of elements present in fracking water processed by the present invention to levels of the same elements present in the drinking water for the City of Chandler, Ariz.

DETAILED DESCRIPTION

In the following detailed description of the preferred embodiments, reference is made to the accompanying drawings that form a part hereof and in which are shown by way of illustration specific embodiments in which the invention may be practiced. The drawings are heuristic for clarity. It is to be understood that other embodiments may be utilized, and structural changes may be made without departing from the scope of the present invention.

Mobile Application with Small Form Factor

Figure 1A:
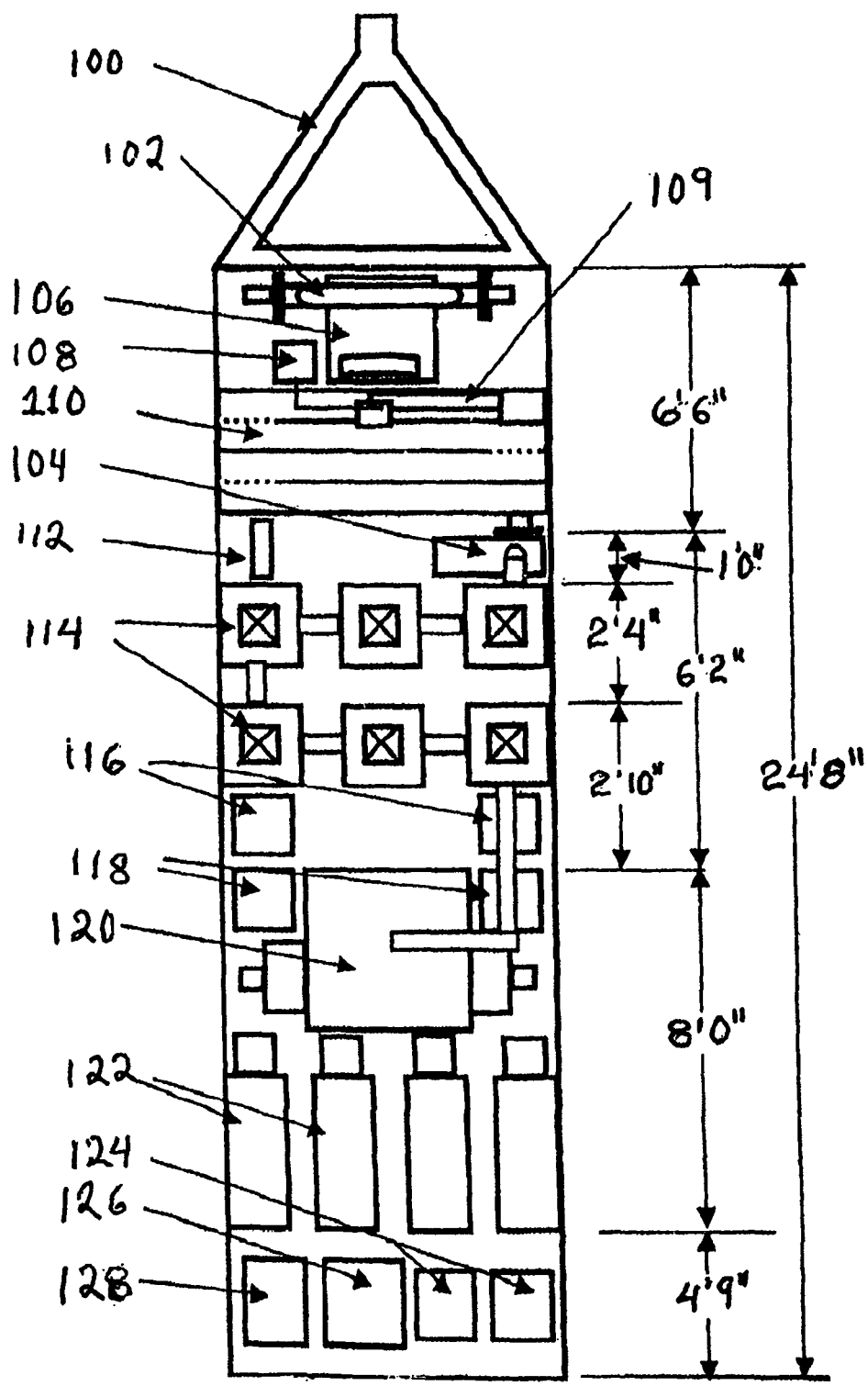
FIG. 1A is a schematic top view of a mobile desalination system comprising a desalination unit and associated resin flow units integrated onto a trailer that can be towed into place according to an aspect of the invention.

Referring to FIG. 1A, according to an aspect of the invention, an entire desalination system, including continuous flow resin units, can be integrated on a 30-40 foot goose-neck trailer 100. As is well understood, other equivalent trailer hitch configurations may be substituted. As shown, the actual length of the bed of the trailer is 24 feet, 8 inches. This enables an effective desalination system to be reduced to an advantageously small form factor, towed into place, and run in tandem with other mobile systems to provide a high throughput, cost-effective desalination system without the need for the large capital expenditure of conventional desalination facilities.

FIG. 1A represents the preferred mode of integrating desalination components on a trailer for mobile applications. The component dimensions are shown on the right side of FIG. 1A. Referring to FIG. 1A, the main elements of the mobile desalination system are as follows: a salt water feed system is provided at 102. This is powered by a primary pump 104. Water is conducted to a desalination core 106. The core comprises a series of self-similar fractal stages as explained with reference to FIG. 2. A precipitation system 108, water mixing unit 109, and sedimentation tanks 110 are provided for removing heavy metals and particular matter from the desalination core 106.

An electrical control system is provided at 112. The electrical control system 112 controls flow rate as a function of processing speed and can optimize throughput of water processed by the system. A series of continuous flow resin units are provided at 114. These further clean the output water from primary desalination unit 106. Pump 104 also has a connection with the continuous flow unit as shown for pumping output water there through. Additional anion and cation resin tanks for holding additional resins are provided at 116. Resin recharge solutions for recharging spent resins are provided at 118. A fresh water tank for holding the fresh water that has been processed through resin units 114 is provided at 120. Trommels for treatment of pregnant resins are provided at 122. Tanks for holding pregnant resins are provided at 124. A primary residue holding tank 126 and an optional residue filter press 128 are also provided.

It will be appreciated that other combinations of desalination components and alternate configurations of such components may be utilized to integrate a desalination unit on a trailer for mobile applications without departing from the scope of this aspect of the invention. Also, the foregoing non limiting example integration contains many ancillary components to desalination that are well-known, and are not essential to the practice of the invention. Therefore, such ancillary, well-known components need not be described.

The mobile aspect of the invention advantageously enables capital equipment and operating costs to be extremely low, approximately ⅛ compared to a conventional membrane or thermal based desalination system. In the practice of the invention, the intake pumps and resin circulation pumps require only 240 volts, three-phase, and easily can be run by a generator when utility power is not available. There are no moving parts other than an input pump, and pump for circulation of the resins.

Subsurface Screened Intake

Figure 1B:
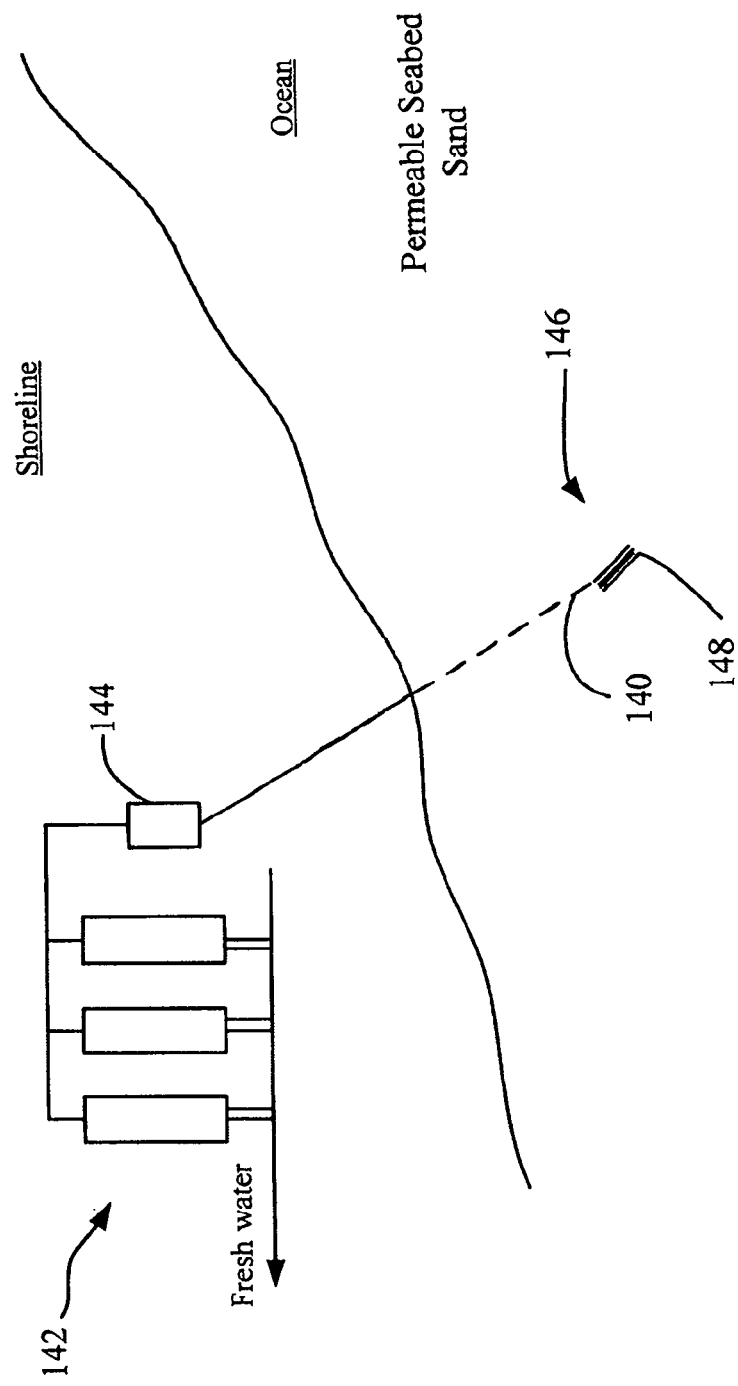
FIG. 1B is a schematic view of a plurality of mobile desalination units that can be towed into place and receive a supply of input seawater through a horizontally drilled subsurface intake deployed beneath the ocean floor according to an aspect of the invention.

Referring to FIG. 1B, in a preferred embodiment, horizontal well drilling techniques are employed to provide one or more subsurface transport conduits 140 for pumping salt water from a water permeable zone such as sand or rock located well underneath the sea bed or ocean floor. This enables a plurality of mobile desalination units 142 to be located at a desired distance up to four miles or more removed from the ocean or estuary shoreline. A pump 144 is provided for pumping seawater through the subsurface conduit 140 into the desalination units. Subsurface conduits 140 are provided with slotted or screened intake ends 146, such as are well known for water wells. A plurality of slots 148 or equivalent means for providing one way flow of water and for screening out solid particles and debris typically are provided on the distal ends of the intake conduit parallel to the longitudinal axis of the conduit as shown. The slots have a preferential orientation that allows water to enter, but screens out mud and sand.

Alternately, the intake ends 146 may be provided with equivalent means for screening out solid particles and debris, from intake water such as directional screens, either integral with the conduit 140 or fitted on the ends. The screens define essentially one-way flow through apertures that facilitate entry of water, but screen out solids. This further allows sand or other substrate beneath the sea bed to filter intake water naturally. This provides the advantage of preventing inadvertent intake of small aquatic organisms essential to sea life, and also preserves floating aquatic life, such as floating fish eggs, larvae, or fry of valuable inshore sport fish such as striped bass, shad, or the like.

Pumping seawater from beneath the ocean bottom, by means of long transport pipes and slotted intake screens, advantageously enables the siting of a desalination plant at any convenient location, not necessarily adjacent the shoreline. This provides a significant public benefit by preserving public access to shoreline areas. Also, by enabling a small form factor desalination facility to be located far inland, this aspect of the invention advantageously can make use of unwanted land, such as parking lots, for a desalination system, and thereby can facilitate the protection and long term preservation of critical estuary and shoreline habitat.

Desalination Process

Figure 2A:
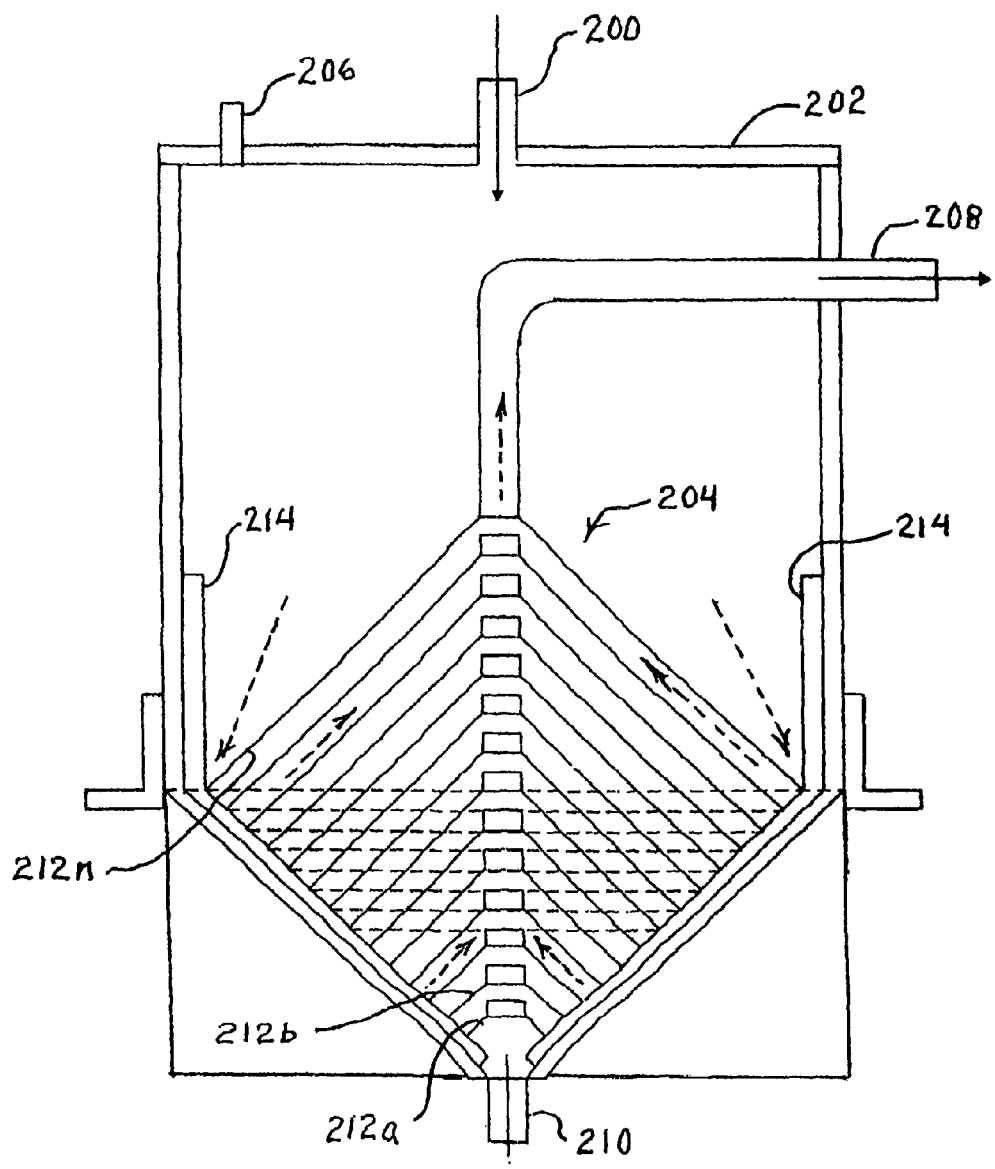
FIG. 2A is a schematic side sectional view of a desalination apparatus showing a cascade of self similar fractal stages for defining a flow path for processing saltwater or other non potable water according to an aspect of the invention.

Referring to FIG. 2A, desalination of a flowable medium, such as salt water (including brackish water, contaminated water, or otherwise non potable water) is accomplished by flowing input water by gravity in the direction of the arrow at an intake 200. An enclosure 202 houses a core assembly 204 defining a fractal flowpath for processing the incoming flowable medium such as salt water. The enclosure 202 has a water intake 200, an air vent valve 206, and exhaust conduit 208 at the output end of the core assembly for conveying the processed output water to the continuous flow resin system of FIG. 4. A valved drain port is provided at 210. The input water flows downward through intake 200 by gravity, and continues downward in the direction of the dashed arrows along the core assembly 204 and to the sides of the enclosure 202.

The enclosure 202 is preferably made of steel and defines an ion chamber at 203 for exposing the water flowing upward through stacked pyramidal stages $212a \ldots 212n$ to ions in the ion chamber. The core assembly 204 comprises a series of self-similar fractal stages $212a, 212b, \ldots 212n$ that define a fractal flow path for recursively magnifying an increasingly strong electro-hydrodynamic field and electric charge on throughput water at each stage. The series of self-similar stages, $212a, 212b, \ldots 212n$ in a preferred embodiment comprise a concatenated, cascade of inter-fitted, square pyramidal cones. The fractal stages are arranged coaxially about a central bore defining a flow path, such that the output flow of a preceding fractal stage provides the input for a successive stage. The inter-fitted fractal stages are secured by welds or other fastenings to four spacer bars 214, located on each of the four sides of the series of square pyramidal cones.

Other polygonal structures may be employed as stages, such as square prisms, or prisms having a square base. A square pyramidal construction is selected as the initiator fractal stage in a preferred embodiment. The apex of the pyramid projects ion energy downward to the ion chamber. The square bases and increasing lengths of the fractal stages $212a$-$212n$ also provide counter rotating flows (shown by arrows in FIG. 2B) between the parallel plates of the stages, that facilitate a recursively magnified vector of electro-hydrodynamic flow in an upward direction.

The fractal stages also define a plurality of self-similar venturi openings to the central, flow path that facilitate acceleration of a flow vector into the main flow path and provide a pull of water upward through the central bore. The spacer bars 214 allow water to flow to the bottom of the V-shaped pyramidal configuration. The angle of the pyramidal configuration is preferably selected to be between 20 and 70 degrees with respect to the sidewall of the enclosure box 202.

In operation, a flowable medium initially flows downward by gravity through the intake, to the bottom of the V-shaped pyramidal configuration comprising the self-similar fractal stages. The stages are built around a central co axially aligned bore that defines a primary flowpath from one stage to the next. The flowable medium such as water is then pumped upwards through a central co axial bore and flows upwards through a plurality of fractal stages $212a$-$212n$. Any convenient number of fractal stages may be utilized. The total number of stages is constrained by the space needed for the unit. In the embodiment shown in FIG. 2A thirteen fractal stages are shown. Water also flows upward between pyramidal fractal stages 212a-212n in the direction of dashed arrows as shown. The throughput exhaust conduit 208 is provided with an output port (not shown) that is mounted below the bottom of the top pyramidal cone and therefore provides a siphon effect, that pulls the water the upward through the pyramidal stages 212a . . . 212b in the direction of the dashed arrows. A pump (not shown) must be able to supply enough input water to the system to keep it from running low of water during operation. Because of the siphoning effect, water resistance through the core is minimal. The flat or square venturi surfaces define a fluid trajectory. Flow is pulled in a self gravitating manner as opposed to being pushed through the fractal stages. Therefore, flow is non-dissipative, self-sustaining, and non-turbulent. The series of venturi (FIG. 2B) also enhance the siphon effect that pulls water through the fractal stages. The siphon effect advantageously enhances throughput and greatly reduces pumping time and cost. This enables the present invention to be operated extremely cost effectively as compared to a conventional desalination system.

Self Similar Fractal System

An aspect of the invention utilizes fractal scaling laws inherent in a series of self-similar fractal stages for defining a flow path for recursively magnifying a vector flow of water through each successive fractal stage. The fractal stages propagate recursively and magnify a strong electro-hydrodynamic field at each stage that is imposed upon the flow vector.

In constructing the fractal flow path, the initiator is the starting shape [selected geometric construction at the beginning of the series, for example, square pyramidal stage 212a]. The generator is a rule for producing a series of scaled copies of the initiator at each stage The generator rule is applied recursively to build scaled copies of the initiator 212a at each successive stage 212b, 212c, . . . 212n.

In the practice of the invention, it has been found that the connected series of self similar fractal stages define an iterative fractal flow path for applying recursively at each stage an increasingly powerful electro hydrodynamic field and positive charge upon particles and molecules of a flowable medium, such as salt water, in the flow path.

Also, each stage defines a counter flow through parallel plates, that is returned to the central coaxial flowpath through a venturi. The counter flow between the parallel square plates has been found to increase a strong electro-hydrodynamic charge that can be impressed upon a vector flow of flowable medium.

The self-similar fractal stages that define a flow path for the flowable medium are characterized by magnification. The self-similar stages scale up in size in the direction of flow according to a fractal scaling rule, such as Phi, 1.1618, The magnification associated with scaling laws of self similar fractals is applied to the flowpath and particles entrained therein at each respective stage. This enables a recursive magnification of flow acceleration, decrese in pressure, and increase and/or magnification of electro hydrodynamic field effects on the flowable medium and entrained substances. This also enables, for example, NaCl bonds to be broken, chloride to be gasified, and sodium to be extracted from the flowpath as a powder.

Magnification of electro hydrodynamic fields also occurs, and such magnified electrical fields have been found to affect particle charge down to a sub atomic level. See Table 1 of Test Results.

Figure 2B:
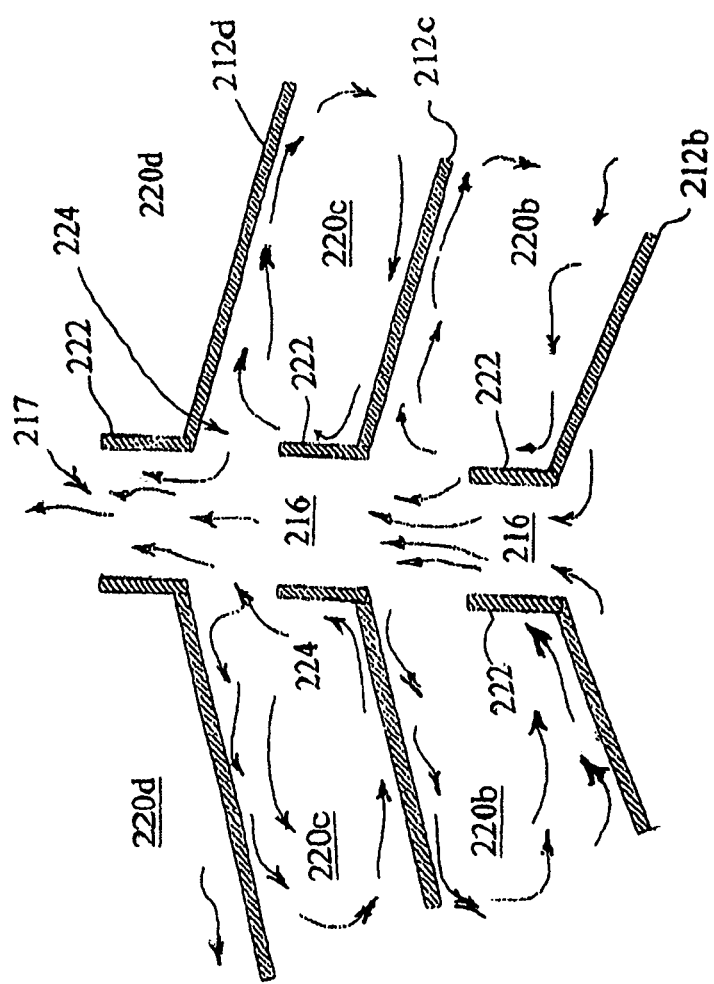
FIG. 2B is a schematic diagram of vector flow through selected fractal stages of FIG. 2A according to an aspect of the invention.

Referring to FIG. 2B, the counter flows of water through the sides of the stages develop a strong electro hydrodynamic field and positive charge upon a flow vector of the flowable medium moving through each stage.

Referring to core 204 in FIG. 2A, beginning at the bottom; the initiator (first or bottom) stage 212a is chosen as a square pyramidal cone having a square base and tapering sides at an angle selected between 20-70 degrees with respect to a centrally disposed preferably square bore 216 that defines a central flow path through the stages. All stages 212a . . . 212n are coaxially aligned about the central bore. Each successive square pyramidal stage 212b, 212c, . . . 212n is a scaled copy of the initiator 212a, and becomes progressively larger by a fractal generator as the self-similar stages are stacked.

In a preferred embodiment, the scale ratio between the generations or cascade of fractal stages is Φ (1.618). The scale ratio of Φ results in a fractal dimension (D=Log N/Log (1/r), where N is the number of self-similar objects and r is the scale ratio. However, as is well understood, other fractal generators can be selected and stages having different proportions or geometric constructions can be selected to define a series of self-similar fractals. This still would provide a fractal flow path wherein the initiator construction is selected to define a fractal flow path that would impress a desired electro-hydrodynamic effect recursively upon the water at each generator stage. Therefore, such modifications using other geometric shapes and scaling ratios are still within the scope of the present invention.

Fractal Scaling

In a preferred embodiment, the stages 212b-212n scale with respect to the initiator stage 212a in the length of the angled sides, and in the length and width of the square base, The central bore 216 of the initiator stage 212a remains constant in the generator stages 212b-212n. The generator stages are stacked in coaxial alignment about the central bore. The stages, including the central bore, define a flow path for recursively applying a strong electro hydrodynamic field upon water at each stage. An ion chamber 203 is located below the stacked pyramidal assembly.

Referring to FIG. 2A, energy is projected constantly from the pyramidal assembly downward to all areas below the pyramidal assembly similar to a shape charge effect. The stacked pyramidal cones also define a series of self similar fractals from top to bottom that define a fractal flow path for recursive projection of electro hydrodynamic energy opposite the direction of the water being pulled upward through the pyramidal stack. The focusing of energy from the larger pyramidal cones to each self similar smaller stage also comprises a fractal flow path characterized by recursive acceleration of electron flow similar to a shape-charge effect. This has been found to be active even when there is no upward flow through the core.

In the practice of the invention, it has been found that the ion chamber 203 advantageously enables an ion-exchange to occur in gases and liquids independently of the primary operations taking place simultaneously in the upwardly directed fluid flow path above the ion-chamber. Example: the removal of acids from air or other gaseous carriers. Ion chamber 203 also removes acids from liquids independent of the primary function taking place in the flowpath through fractal stages 212a-212n.

Referring to FIG. 2A, in a preferred embodiment, the cascade of self-similar fractal stages comprise self-similar pyramidal cones with square bases, stacked together or inter fitted within one another with suitable spacing between stages. The stages are coaxially aligned about a central bore that defines a central flow path for processing a vector of flowable material through each stage. Counter flows of flowable medium occur in spaces between the plates that comprise the sides of stages and are returned to the central flowpath through a venturi output 224 in FIG. 2B.

In a preferred embodiment, the flowable material is water in need of remediation, including all elements and substances held in suspension therein, such as salt water in the form of ocean water, brackish water, oil field production water, or irrigation water. The flowable material also may include waste water and water contaminated by radioactive material. Preferably, the self-similar fractal stages scale in length/height of the pyramid, and in length and width of the square. The bore is preferably a square conduit, but other planar configurations are possible. It is believed that a circular bore may break up laminar flow and lessen the venturi effect.

Fractal Flow Path Recursively Magnifies Electro Hydrodynamic Field

The stages 212a-212n comprise self-similar fractals defining a flow path for vector flow of a flowable medium such as salt water including suspended solids. FIG. 2B shows a close up representation of flow through a plurality of a selected cascade of three concatenated fractal stages, 212b, 212c, 212d of FIG. 2A. To provide self-similarity, each fractal stage is constructed in generations, wherein each generator is a scaled copy of the initiator; stage 212a in FIG. 2A. The stages are geometrically the same at larger or smaller scales, and thus scale invariant. The length of the sides and base of the pyramidal squares are scaled in the subsequent generations according to a fixed scale ratio; such as, in a non-limiting example: Φ 1.618.

Advantageously, the iterative nature of the fractal flow path defined by the self similar fractal stages has been found to impose recursively a strong positive charge on water passing through the fractal stages. The output of one iteration at a first fractal stage provides the input for the next iteration at each successive fractal stage. Thus, the effects imposed upon a vector flow of water magnify recursively at each stage. This results in a self selection effect on contaminants, such as heavy metals suspended the flow vector through the fractal stages.

Referring to FIG. 2B, a major portion of flowable medium flowing down from the intake 200 in FIG. 2A flows down along the angled sides of pyramidal stages and enters the coaxial central bore 216 at the bottom and is initially pumped up through bore 216 until a pulling effect takes over and pulls the flowable medium through the bore. Flow streamlines are indicated by the arrows. Flowable medium also enters a space 220b. 220c, 220d defined by corresponding angled sides of adjacent cascaded stages 212 b, 212c 212d. Water entering the spaces 220b, 220c, 220d tends to develop a counter flow against the sides of the stages as shown by the streamlines/arrows. The counter flow results in a high capacitance of positive charge that builds up between stages in the spaces 220b 220c, 220d, . . . 212n. as energy enters the square conduit 216, and the square bases of stages 212 a, 212b, 212n. [Refer to FIG. 3 infra.] The scaled, parallel adjacent plates or sides of stages 212b, 212c, 212d, function as large capacitors, accumulating electric charge. Electric charge as the result of an electro hydrodynamic (EHD) field is also developed from hydro-kinetic flow through the central bore 216 and from the counter flows in the corresponding spaces 220 defined between the parallel adjacent plates 212b, 212c, 212d of the self-similar fractal stages.

The counter flows in combination with the flow vector through the central bore 216 in turn build up a strong electro-hydrodynamic field (EHF) that is magnified recursively and non linearly through each stage as a result of fractal scaling laws. That is, each subsequent self similar stage defining the flow path through bore 216 receives the input of a previous stage and iteratively accumulates the charge build up and flow characteristics from each preceding stage, resulting in a progressively higher EHD field, charge accumulation, and accelerated flow vector that are exponentially different from the preceding stage.

In addition, the angled side of each stage 212b, 212c, 212d, has an upwardly projecting square section 222 at its interior distal end that defines the preferably square, central, coaxial bore 216. Projection 222 also defines a narrow opening 224 communicating between the spaces 220a, 220 b, 220c and central bore 216. It will be appreciated that projections 222 confine counter rotating flows in spaces 220b, 220c, and so on. Projections 222 also define a narrow convergent passage or venturi 224 for accelerated flow at reduced pressure back into the bore 216. The convergent passage 224 acts as a venturi throat and imposes a venturi effect upon water flowing back into the bore at each stage. The venturi provides an output for accelerated flow out of the spaces 220 and into a flow vector developed within bore 216. Venturi 224 reduces pressure and increases acceleration of the central flow vector through the bore 216 at each fractal stage. This is indicated by the arrows or vector streamlines 217. The volume of flow through the venturi also magnifies at each fractal stage due to fractal scaling. Fractal scaling increases volume and decreases pressure in spaces 220 defined by each successive corresponding stage 212. This also advantageously enhances a pulling effect of the flowable medium through the system. Each venturi 224 also acts as supply venturi disposed orthogonally to the core flow for supplying the increased energy need of the recursively increasing velocity of core flow and respective contact/advective laminar flows that form on the walls of the square conduit at each fractal stage. Other equivalent means for providing constricted, convergent flow for producing a venturi effect at the output of each stage are possible. Examples would be projections, baffles, flow diverters or the like, such that the flow of flowable medium is recursively accelerated as a flow vector at each stage. The effect of such a recursive venturi effect is that the flowable medium is pulled rather than pushed or thrust along the flowpath to an output. This advantageously decreases the energy needed for pumping and greatly reduces pumping cost.

Heavy metals are selectively dropped out of solution at various stages according to a self-selective interaction with a particular stage according to the intensity of the electro hydro-dynamic field at each stage, and the affinity of properties of heavy metals and other substances passing through that stage, such as ionic charge, number of protons and electrons, specific gravity, and electromagnetic field (EMF) signature. The iterative nature of the fractal flow path impresses recursively a strong positive charge on water passing through the self similar fractal stages. The output of one iteration at a first fractal stage provides the input for the next iteration at each successive fractal stage. Thus, the effects imposed upon the flowable medium magnify at each stage.

Referring to FIGS. 2A, 2B and C 2C, in a fractal flow path, the first or initiator stage 212a comprises a geometric construction, selected for its geometric characteristics for developing and/or propagating an energy field, and is referred to as the initiator or initiator stage. In this case, as a non-limiting example, the initiator 212a comprises a pyramidal cone. In accordance with fractal scaling laws, the generator is a rule by which each scaled copy of the initiator is constructed and inserted in a series (denoting spatial and temporal succession) for defining a flow path for receiving and processing the flowable medium. In this case, as a non-limiting example, a constant Φ 1.618 is the generator used to produce a regular cascade or series of scaled copies of the initiator that are the self-similar fractal stagesstages. The scaling rule applies to produce a series of scaled copies of the initiator 212a wherein the base and the length and sides of the pyramidal cone scale in the X,Y directions.

Figure 2C:
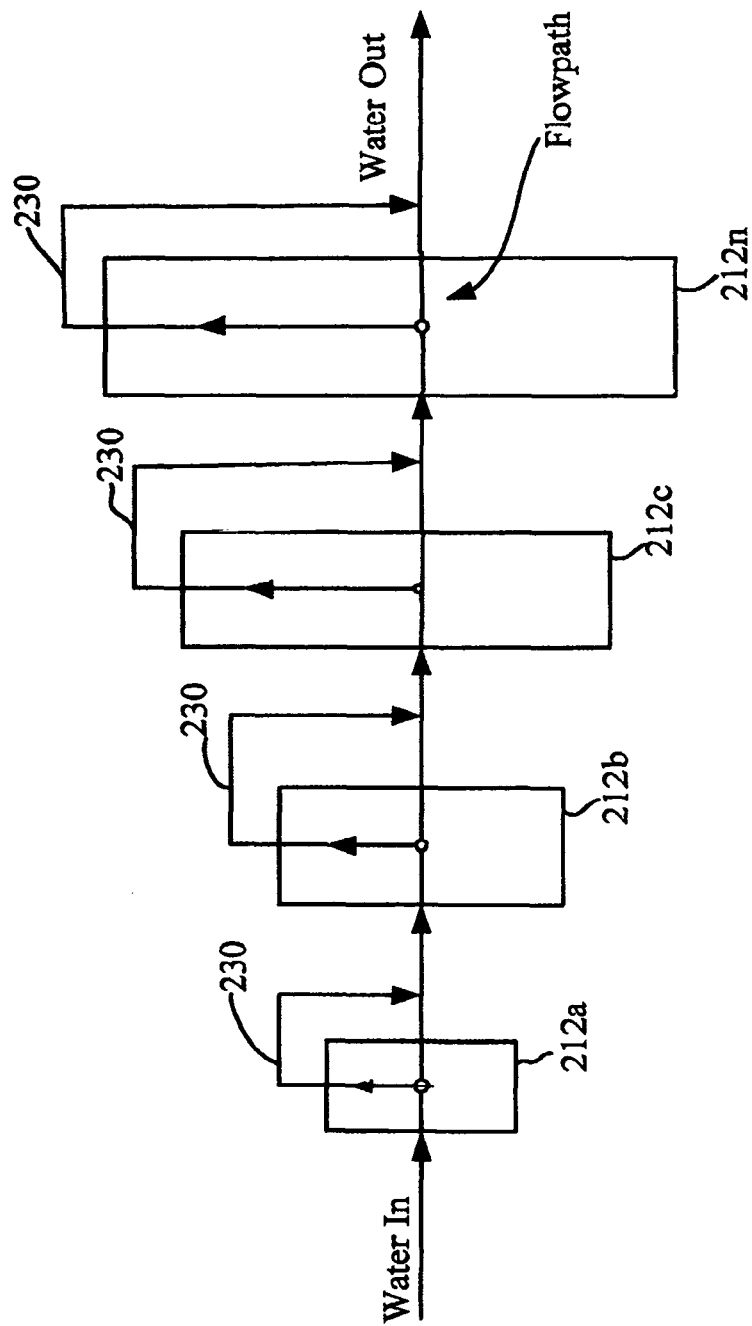
FIG. 2C is a heuristic schematic diagram showing the concept of recursive magnification of flow through a series of cascaded self-similar fractal stages, according to an aspect of the invention.

In practice of the invention, scaling applies to the iterative reconstruction of the initiator at each stage in the generator. In the case of the flowpath defined by the generator stages, scaling applies to a logarithmically increasing energy field iteratively extracted from and imposed upon the flowable medium by each generator (scaled copy of the initiator). The effects of each generator stage upon the flowpath of flowable medium are recursive. The output of a first stage such as 212a provides the input of a successive downstream stage 212b and so on. The flow path is iteratively processed at each stage, such that each successive stage receives at an input the iterated output of all preceding upstream stages. This enables each successive stage to impress recursively a unique electro hydrodynamic field upon the flowable medium moving through that stage The fractal flow path as used herein is characterized by magnification and iteration of processing results upon the flowable medium at each stage. The processed flowable medium at the output of a first stage becomes the input for recursive processing by each successive stage as shown in FIG. 2C.

Magnification as used herein refers to the magnification/increasing dimensions of the geometric construction of the initiator at each successive stage, along with a resultant increase in magnitude of an electrical field and electric charge impressed upon the flowable medium through each fractal stage. For example, increasing the scale of a venturi defining a flowpath at each stage results in iteratively magnifying or increasing acceleration of the flowpath into a flow vector of increased velocity and reduced pressure at each stage. Increasing the dimensions of the parallel plates comprising the stages also results in magnification of the rate and volume of counter flows between parallel plates. Consequently, this increases the density of electric charge and magnitude of the electro hydrodynamic field that can be extracted from the flow path at each stage.

Magnification also refers to the recursive application of an electric charge and electro hydrodynamic field upon the flowable medium at successively magnified scales, such as molecules, atoms, charged particles, and charge carriers, such as information exchange bosons at the sub atomic level.

Energy Dynamics of Geometric Constructions

Energy flow as used herein may be simplified to refer to the ways geometric constructions can focus and/or develop energy flow from the four fundamental forces. For example, gravitation affects all matter. Gravity may be defined as the energy resulting in curvature of space. The exchange carrier for the gravitational force may include gravitons, or geons-semi stable collection of electromagnetic or gravitational wave energy.

The strong nuclear force affects hadrons that are made up of quarks. Electrons and neutrinos do not feel the strong nuclear force. The charge carrier or information exchange particle for the strong nuclear force is the gluon.

The electromagnetic force is represented by photons (massless, infinite wave energy), neutrinos, quantizations of charge, electrons, protons and other forms of energy, including electro hydrodynamic energy—an electric field developed or induced by a strong hydrodynamic flow against or tangential to an adjacent surface. The photon γ is the exchange boson or force carrier for the electromagnetic force.

The force carrier for the electric weak nuclear force (force of the sun) is the W boson; represented by W+, W− or Z.

Everything is affected by the weak nuclear force, and everything is affected by gravity. Every charged particle is affected by the electromagnetic force.

By applying fractal scaling laws, geometric constructions, arranged in a self-similar fractal series, have been found to exhibit connectivity properties that facilitate efficient, recursive collection and transport of electrons, protons, and forms of electromagnetic energy. Such geometric constructions may be arranged in a fractal series to define a flow path for a flowable medium. The fractal series, characterized by magnification, can be used to produce an extremely strong, recursively increasing electro-hydrodynamic field from a flowable medium.

Figure 3:
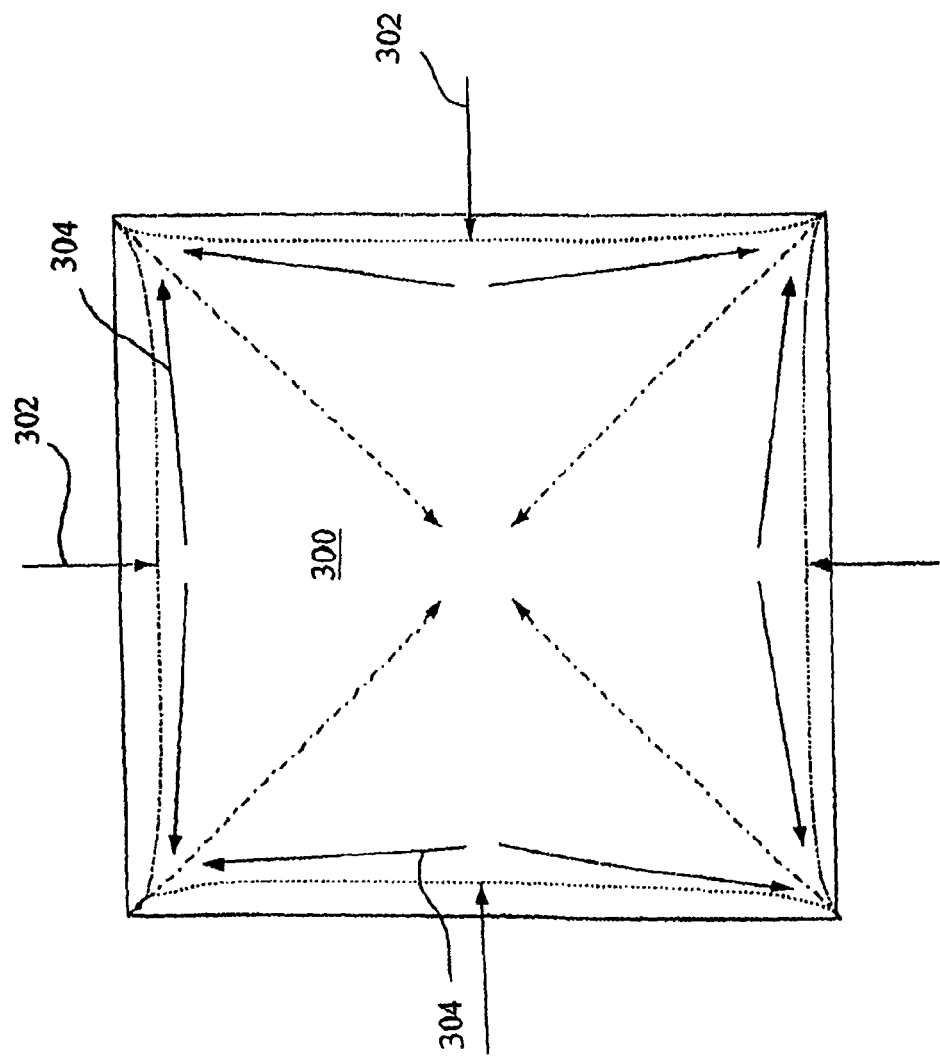
FIG. 3 is a schematic diagram of energy flow through a square, such as a square base of a given fractal stage of FIG. 2A according to an aspect of the invention.

Referring to FIG. 3, a square 300, such as the centrally defined square flowpath defined by central coaxial bore 216 of self similar fractals 212a-212n, or square pyramidal shape of the self-similar fractal stages has been found to produce desired energy collection and transport functions. Each stage beginning with the initiator (212a in FIG. 2A) must move energy in a given time period of fluid flow through that stage. This means the energy flow is faster in each successive stage. Electric charge capacitation or build up is increased as the velocity of the flow vector increases through each generator stage.

Referring to FIG. 2A, the fractal stages comprise a cascaded series of self similar square pyramids stacked upon one another. The apex of each pyramid and the sides define a first fractal flowpath in a first direction from stage 212n to stage 212a. In this case 212n is the initiator and the subsequent pyramids are generators. The first flow path provides a means for projecting ions in a direction from 212n to 212a. A second cascaded series of self similar fractals comprise the square bases and angled sides of stages 212a through 212n. These stages scale in the opposite direction from 212a through 212n. This defines the fractal flowpath for processing of a flowable medium such as salt water, as described.

Referring to FIG. 3, a square advantageously causes energy to rotate about the periphery of the square as long as the square has its structural integrity intact. Energy enters the square on the sides at 302, then travels to the right and left corners on the entry side. As like particles of energy accumulate at each corner or apex; they repel each other, taking the line of least resistance to the center of the square. The positive particles rotate counter clockwise, leaving the square. The negative particles leaving the square at the bottom rotate clockwise. The repelling action of like particles escaping the corners causes a low energy zone in the corners. This energy low density zone in the corners causes a flow of free mass energy, such as free mass electrons, into the square. The repelling action of the like particles escaping the corners provides the strength of a gravitational field as energy is pulled into the square by the low density zones in the corners.

Referring to FIGS. 2A and 2B, due to the square configuration of the central bore or conduit 216 defined by square pyramidal fractal stages, the flow vector 217 upward through bore 216 rotates 90 degrees in the same direction at each stage. The flow through the bore 216 reacts in response to a recursively increasing electro-hydrodynamic field developed in the bore 216 and in response to an EHD field developed by the counter flows in the square spaces 220 at each stage. It will be appreciated that the flow vector through bore 216 increases recursively due to the venturi effect iteratively imposed upon vector flow by venturis 224 at each stage. Also, counter flows in spaces 220 increase recursively at each stage due to fractal scaling laws by the increasingly longer sides, larger volume, and faster counterflow rate against the parallel plates or sides that act as capacitors. The counter flows thereby produce a recursively increasing EHD field.

Referring to FIG. 3, a gravity power arc or curve 304 controls the velocity of like free mass energy particles entering and leaving the corners. The greater the gravitational power curve the greater the energy need or requirement within the square. Thus, the greater the gravitational field propagation in the area surrounding the square. The gravity power curve controls the energy need in each of the four corners.

Accordingly, using the geometry of a square in a series of self-similar fractal stages to define a flowpath advantageously has been found to increase recursively the velocity of a vector of flowable material, as well as the energy applied recursively to the flow vector at each fractal stage. Flow is pulled (as opposed to pushed or thrust) at progressively greater velocities and lower pressures due to concatenated self similar venturi stages.

The recursive application of the energy of the fractal stages upon the flow vector advantageously may activate water's self-organizing abilities by the recursive input of electro-hydrodynamic energy at each successive fractal iteration. This is believed to promote an ordering of water molecules and to impose recursively a succession of electron and proton transfers on the flow vector. Such a mechanism may impose an excess proton or protonic defect that diffuses through the network of hydrogen-bonded water molecules through the formation or cleavage of hydrogen and covalent bonds.

FIG. 2C shows the concept of recursive application of an electro-hydrodynamic field or charge characteristic on the flowpath of flowable medium. Arrows indicate flow. The central arrows indicate flow through the central flowpath along which the stages are coaxially aligned. The upward trending arrows indicate flows through the interior of each fractal stage that recursively accumulate an electric charge.

It will be appreciated that each self similar generator stage is a unique, scale invariant copy of the initiator stage, and has a unique, logarithmically increasing charge density and electro hydrodynamic field strength due to fractal scaling. Therefore, each fractal stage further comprises a means for providing a specific electric charge interaction and selection on the flow path, such that particles and molecules suspended in the flowable medium become self organized, and are selectively aggregated and removed from the flowpath by the specific electromagnetic field signature occurring at each stage.

Continuous Flow Ion Exchange Resin System

Figure 4A:
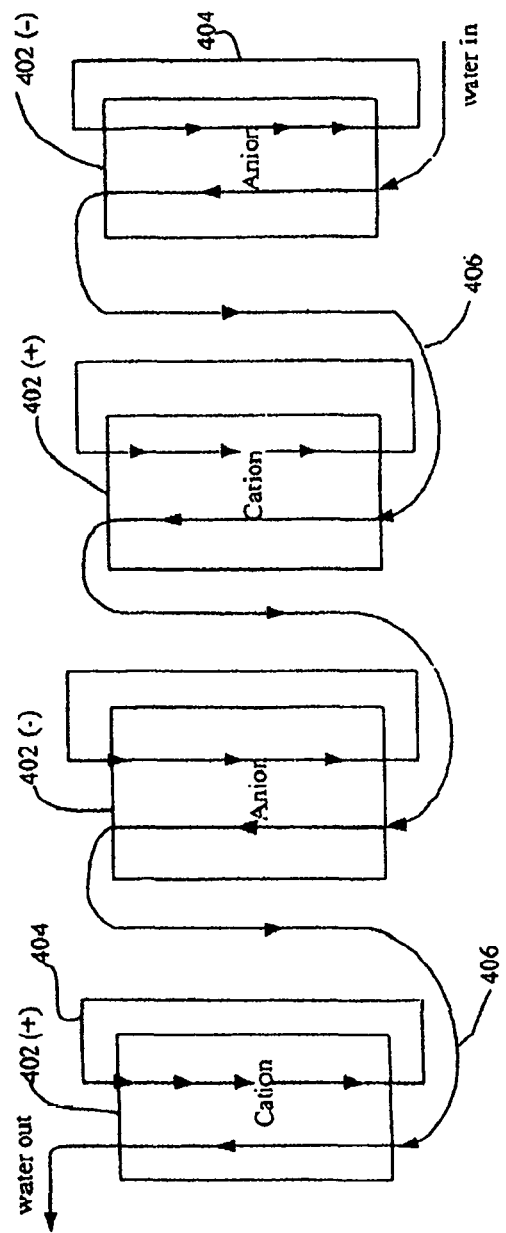
FIG. 4A is a schematic view of a continuous flow resin system comprising alternating cation and anion canisters for cleaning throughput water from the fractal flow path according to an aspect of the invention.

Referring to FIG. 4A, a continuous flow resin system 400 comprises a continuous unidirectional flow of resins that cleans the charged water molecules of excess electrons and contaminants, and maintains the ion exchange capability of the resins over a greater time than is possible in a conventional columnar ion exchange system.

A plurality of ion exchange resins are employed in a continuous flow configuration, for resin flow through alternating ion exchange containment vessels 402 (+), 402(−) containing alternately cation (+) and anion (−) resin beads to further clean the water processed from the desalination core. In a preferred embodiment, cation resins comprise Dupont Cation C211-H or the equivalent. Anion resins comprise Dupont A464-OH or the equivalent. The resins comprise ion exchange beads approx. 16-40 mesh in diameter.

The plurality of anion and cation resin beads are circulated unidirectional in a first direction in alternate corresponding cation or anion exchange canisters 402 (+), 402(−). Each anion or cation exchange canister or containment vessel defines a continuous, hydrodynamic flow path of alternating cation and anion resin streams. The resin exchange canisters 402 define a resin flowpath 404 provided for flowing in a first direction, indicated by arrows, over and against the throughput water that comprises highly charged water molecules, including excess positively charged particles and electrons. The ion exchange canisters define a second flow path of throughput water in a second direction (406) opposite and against the flow of resins.

Each canister 402 (+), 402(−) defines an ion exchange flow path characterized by a continuous flow, alternating between either cation or anion resins. Cation and anion resins are circulated separately through separate canisters. As is well understood by those skilled in the art, each resin flow path can be operated separately by a single pump. It is also within the scope of the invention to provide a pump controller to coordinate the flow rate of resin circulation to optimize ion exchange as a function of resin density, rate of water flow, and other common variables.

In practice of the invention, such a continuous flow-through resin exchange system may contain any convenient, preferably even, number of alternating cation and anion flow through canisters 402. For clarity, four flow through ion exchange vessels or canisters 402 are shown, in alternating cation/anion configuration.

Figure 4B:
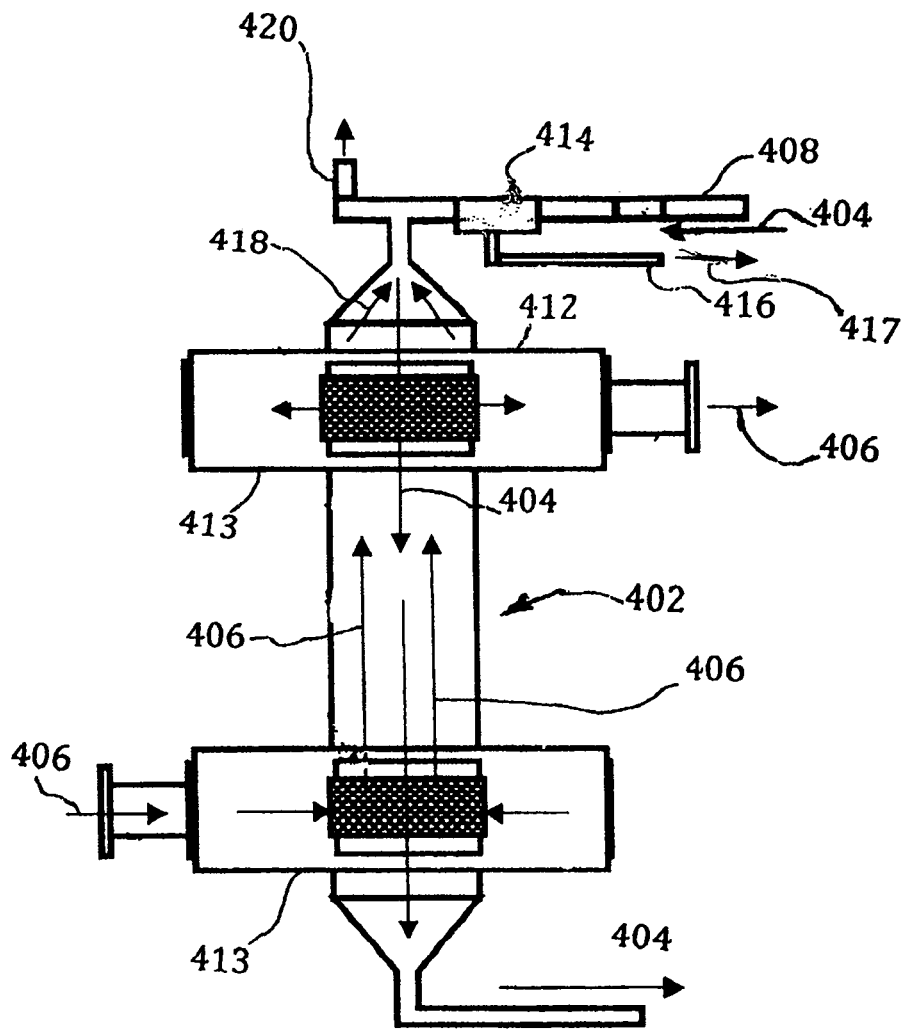
FIG. 4B is an enlarged schematic diagram of a single resin canister of FIG. 4A.

The details of an ion exchange canister 402 are shown in FIG. 4B. The canister 402 has a central portion of uniform dimension that defines a first resin flow path in a first direction shown by arrows 404 for pumped, circulated resins at an intake 408. The canister defines a second flow path 406 for throughput water from the fractal flow path that enters the canister at intake 410. The canister 402 is provided with circular screens 412 at the intake and output ends of the flow path 406 for water. The screens are enclosed by reservoirs 413 that guide flowpath 406 of water into and out of the canister 402. The screens provide substantially non-turbulent, uniform flow of water at intake and output ends of the canister. This aids in defining unidirectional flow of a high volume of water into flow path 406 opposite and against the flow path of resins 404 in the center portion of canister 402.

A resin liquid bypass screen is provided at 414 and resin liquid bypass line is provided at 416 to withdraw liquid at 417. This ensures that a strong flow of primarily resin beads flow through the canister in flowpath 404 to maximize directional unity and an ion exchange against opposing flow path of water 406, and prevent or minimize turbulent liquid mixing within the directionally opposing flow paths.

Due to the separation of Na Cl bonds by the fractal flowpath, Chloride and other gases from molecular separation are collected as a gas from water flowpath at arrows 418 and are withdrawn at gas relief valve 420.

The forgoing arrangement results in resistive flow, wherein opposing streamlines of water molecules, separated atomic particles and resin streams intertwine or otherwise positively engage or collide against each other from opposite directions. Intertwine refers to FIG. 3; vector flow of water and water molecules rotates 90 degrees at each fractal stage.

Thus, input water from the fractal flow path may have a strong rotation or helical flow component. In the continuous resin flow system, each canister (shown in FIG. 4B) defines opposite, opposing directional flow paths for water and resin beads. The flow path for water travels in an opposite direction against the opposing flow path of resins. This configuration has been found to result in collision and/or energy transfer between ion exchange resins and suspended particles as atoms or molecules contained in the opposing flow of water.

The directionally opposing flow paths of ion exchange resins, particles and molecules collide and react in ionic, electron engagement, that is believed to result in the exchange or transformation of energy. The opposite continuous flow of resins against throughput water greatly increases electron and positive particle exchange between throughput water and opposing alternating streams of cation and anion resin beads. In contrast, a conventional resin exchange system is characterized by non-resistive unidirectional flow, that clogs resins, and reduces resin exchange lifetime.

The present system has been found to clean the charged water molecules of excess electrons and contaminants such as heavy metals. It also has been found to maintain or even to prolong the ion exchange capability of the resins over a greater time than is possible in a conventional columnar ion exchange system.

The plurality of resin beads also may define an ion exchange flow path characterized by a fractal scaling effect. The resin beads are themselves self-similar and geometrically scale invariant about a desired size selected from a range of from 16-40 mesh. However, the resins in the flow path are not uniformly scaling in the sense of an ordered progression or line. The resin flow paths are opposite and against the flow path of throughput water. The opposition in direction and flow against the highly charged particles from the desalination unit coupled with the fractal nature of resins may result a strong hydrodynamic flow of resins that exposes a greater amount of individual resins to individual water molecules.

Directional opposition in flow of resins also greatly increases the active surface area for ion and electron exchange between suspended charged particles This may result in a self-interaction effect, increasing ion and electron exchange with individual particles in the opposing flow path of water that can qualitatively change the nature of an energy propagating particle, such as uranium or the like, in the flow path of throughput water. This result is shown in Table 1, test results comparing the composition of salt water processed by the invention to the levels of the same elements found in the drinking water in the city of Chandler, Ariz.

Possible Particle Interactions

The fractal nature of particle paths is well known. It is believed that the observed path of a particle in quantum mechanics is a fractal curve with fractal dimension D=2. Mandelbrot, *The Fractal Geometry of Nature*, p. 239, (Freeman & Co., 1983); L Abbot, M. Wise, *Dimension of a Quantum Mechanical Path*, American Journal of Physics, Vol. 49, pages 37-39 (1981).

The path of a particle undergoing Brownian motion is also a fractal *Dimension of a Quantum Mechanical Path*, American Journal of Physics, Vol. 49, page 39.

In the practice of the invention it is believed that a flow vector including suspended particles passing through a fractal flow path as in the present invention receives a strong electric charge imposed by the recursively applied electro-hydrodynamic field. The path of the flow vector and its charge characteristics are believed to exhibit, at least in part, fractal characteristics. Such fractal characteristics may be responsible for the self-selecting interaction or segregation effect, wherein elements, such as heavy metals, are pulled out of solution at various fractal stages according their electromagnetic field signature and specific gravity. In this case, each stage defining the flow path of flowable medium further comprises a means for providing electric charge interaction and selection at that specific stage, such that particles and molecules suspended in the flowable medium are selectively removed from the flowable medium by a specific electromagnetic field signature occurring at each stage. Such separated particles or molecules are subsequently selectively removed by specific resins as described with reference to FIG. 4A. Moreover, the fractal characteristics of the flow path are believed to enhance the ionic exchange effect of the opposing resin streams on the output water flowing through the resin canisters, as described above.

Fractal Organization of Atoms and Subatomic Particles

Atoms and subatomic entities have fractal characteristics and organization, and obey fractal scaling laws as posited by Mandelbrot, and others (above). In practice of the invention, it has been found that the projection of a vector flow of flowable material through a fractal flow path advantageously may be used to affect charge properties of particles at a sub-atomic level.

In the experimental use of the present invention for processing and desalination of highly concentrated salt water (frack water) with radioactive particles, the throughput water from the output of the flow-through resin system has been found to have radiation reduced to safe background levels. See third party test results in Table 1.

The discussion of the geon posited by J. A. Wheeler may provide one possible basis for explaining the source of energy for accumulation of positive and negative electrons, through which the fractal flow path of the present invention may extract energy and/or electrons from the flowable medium, and impose an electro-hydrodynamic field recursively on the flowable medium at each fractal stage sufficient to suppress radiation.

Figure 5A:
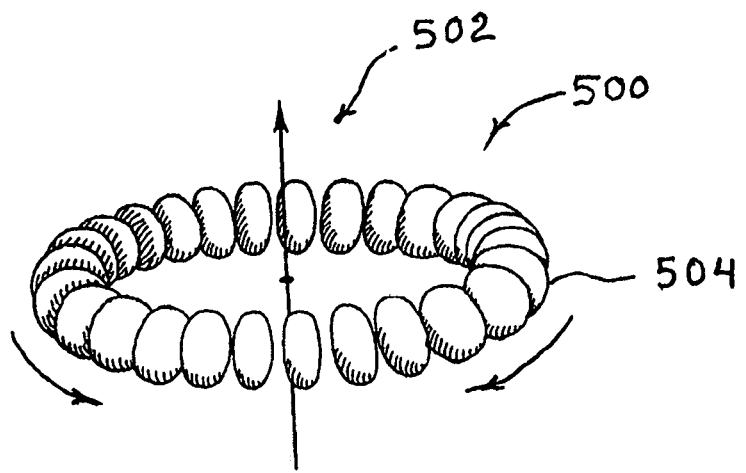
FIG. 5A is a schematic diagram a of physicist J. A. Wheeler's conception of a geon, a gravitational-electromagnetic wave, that obeys fractal scaling laws at a quantum level.

FIG. 5A represents J. A. Wheeler's conception of a geon set forth in J. A. Wheeler, *Geometro-dynamics* p. 133-134 (Academic Press 1961). The geon is an abbreviation for "gravitational electromagnetic entity." Geons are posited as a solution to the problem of coupled electromagnetic and gravitational fields at sub-atomic levels. As defined earlier, a geon is a force carrier for the electromagnetic force that may be coupled with the gravitational force at subatomic dimensions. The geon is used as a construct to explain the electro-gravitic fields produced by subatomic bodies, the motions for such bodies, and why such bodies exist.

Geons in their simplest form obey a scaling law and are scale invariant. See: "*Geons*," J. A. Wheeler, Physical Review, Vol. 97, No. 2, 511, 521 (Palmer Physical Laboratory, Princeton University, 1955). Decreasing all distances of the mass by a factor of n results in increasing all electro-magnetic field strengths by a factor of n, leaving all gravitational potentials unaltered in strength. Thus, geons are in accord with the fractal nature of subatomic entities. When an electric field works on or affects an elementary charge, such as an electron e over its localizability distance $h/mc$, and imparts to the electron an energy on the order of $mc^2$, then this electric field may bring forth pairs of positive and negative electrons from the ambient surroundings. J. A. Wheeler, *Geometro-dynamics* at page 138; *Geons*, Physical Review, Vol. 97, No. 2 (1955) 511, 514.

Referring to FIG. 5A, in its basic form a geon 500 is visualized as a standing electromagnetic wave 502, or beam of light, bent into a closed circular toroid of high energy concentration 504. Two waves of equal strength move around the torus 504 in opposite directions to produce the standing wave. The geon is held in this form by the gravitational attraction of the mass associated with the energy field itself It is posited that the field around a geon may be an external wave, incoming wave or standing wave, depending on initial conditions. An external wave alone has no incoming component and would describe a continual transport of energy and mass out of the geon. *Geons*, J. A. Wheeler, Physical Review, Vol. 97, No. 2 (1955) at p. 521.

In practice of the invention, the discussion of the geon posited by J. A. Wheeler may provide one possible basis for explaining the source of energy for accumulation of positive and negative electrons, through which the fractal flow path of the present invention may extract energy and/or electrons from the flowable medium, and impose an electro-hydrodynamic field recursively on the flowable medium at each fractal stage.

In the invention, the fractal flow path results in recursive extraction of energy from the flowable medium and imposition of strong hydro-electrodynamic fields upon the flowable medium. Referring to Table 1, radiation is suppressed to background levels. This may imply that the fractal iterated system of the present invention may interact with and magnify electromagnetic field effects at a sub atomic level in such a way as to make a contribution to or magnify energy collection. The foregoing is set forth only as one possibility for the source of high energy fields that are applied recursively to the flowable medium by the present invention.

Figure 5B:
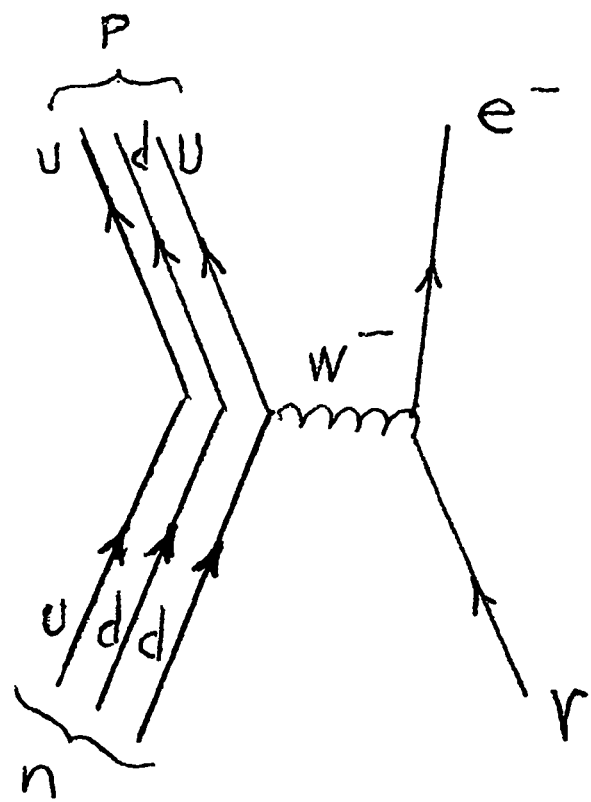
FIG. 5B is a Feynman Diagram showing radiation in the form of beta decay.

FIG. 5B is a Feynman diagram for radioactive beta decay (neutron radiation) showing basic particle interactions such as the conversion of a neutron to a proton, and the emission of an electron and anti electron neutrino. Referring to FIG. 5B, in a model for radioactive beta decay, a neutron having neutral charge, and comprising 3 quarks u,d,d enters from the lower left. This is converted to a proton going out at the upper left. The proton comprises three quarks, u,d,u (1 down quark and 2 up quarks) and a charge of +1. The force interaction or information exchange carrier at the conversion point is represented by the exchange boson W− that quickly decays into an electron e− and an anti-electron neutrino Ve.

Atomic structure appears to be fractal. The diameters of atoms are of the order 0.2 nm (2×10 exponent −10 m). The mass and the positive charge are concentrated in a fraction of the atom; the nucleus. The nucleus is believed to be fractal in nature. It is fractionally divisible into smaller and smaller sub-particles. The neutron consists of protons (p) and neutrons (n). Protons and neutrons comprise smaller subatomic particles, such as quarks, shown in FIG. 5B as u and d [up quarks and down quarks]. Both protons and neutrons have a mass approximately 1840 times greater than an electron (e). The more energy an electron has, the further it can escape the pull of the positively charged nucleus. Given sufficient energy, an electron can transition from one orbital to a higher one. The most probable distance of an electron from the nucleus is the Bohr radius. However, given a sufficient input of energy, the electron is not restricted to this distance; and can become unbound from its orbital, as a free mass electron.

Referring to FIG. 5B, a proton and neutron are not elementary particles. A neutron comprises an up quark u and two down quarks d. A proton comprises two up quarks u and one down quark d. The strength of the force interaction W− is given by the intensity of the field which is proportional to the number of photons or electrons emitted e−. Therefore, the greater the force on a particle the more photons it will emit or absorb. Basically, the amount of charge, or level of energy need, on a particle is proportional to the probability that it will emit or absorb a photon.

With reference to FIGS. 5A and 5B, an aspect of the invention has been found to suppress radiation associated with alpha or beta decay such as radioactive particles or radioactive substances suspended in water, or radioactive particles present out of suspension in water, for example: radioactive dust or evaporated radioactive water leaving radioactivity on structures or in the ground. Beta decay is shown for simplicity.

Suppression of radiation is believed due to absorption by excess free mass electrons released by the recursive application of high energy electro-hydrodynamic fields upon the flow vector at each fractal stage. In the fractal flow path, water molecules including H2 and Oxygen ions also undergo recursive application of an increasingly strong electro-hydrodynamic field at each stage in the flow vector. This recursive effect is sufficiently strong that it separates salt molecules into Na and Cl atoms and appears to influence the level of charge on H2 and O atoms in the flow vector. This aspect of the invention has been found to impress a positive charge on particles and atoms in the flow vector to such an extent that the output water has been found to carry an excess positive charge.

In practice of the invention, it is believed that the recursive application of the electro-hydrodynamic field applies sufficient energy to the flow vector, such that electrons are released from their orbits, becoming free mass electrons.

The output water from the flow vector appears able to absorb radiation up to the level of a saturation point defined by the presence of free mass electrons in the water. As free mass electrons become bound, as in the case of absorbing radiation in the ground or in stationary water, an additional inflow of water containing free mass electrons must be replenished to allow renewed absorption of radiation to occur.

Test Results

Referring to Table I, in the third party test results, the first two rows represent high salt content fracking water sampled near Chandler Ariz. input through processed by the above described system and process according to present invention. The columns show elements and their corresponding isotopes. For example, column 1 shows Lithium (Li, isotope 7) and column 2 shows Boron, isotope 11. The remaining eight rows below the first two rows, for the purified water, show the concentration of elements in the drinking water for the City of Chandler, Ariz.

Referring to page 3 of the results, bottom half; in the column designated 238U (Uranium isotope 238), it can be seen that the above described aspects of the present invention reduced this radioactive isotope to acceptable background levels: 0.377 in rows 1 and 2.

TABLE 1

Purified Fracking Water Analysis
Advanced Technology Laboratory ICP-MS

Analysis Request #R2015-00003　　　　　　　　　　　　　　　　Rochelle Castaneda
Advanced Green Innovations　　　　　　　　　　　　　　　　　　Brett Strawbridge All values are in whole-number parts per billion or at least three significant figures where the values are less than 100 ppb

| Sample List Category | Label | Dilution Factor | 7LI (KED) Value Unit |
|---|---|---|---|
| Concentration average | R2015-00003 Purified water 1× | 1 | 25.4 ppb |
| Concentration average | R2015-00003 Purified water 1× | 1 | 27.3 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| Sample List Category | Label | Dilution Factor | 7LI (KED) Value Unit |
|---|---|---|---|
| Concentration average | R2015-00003 Purified water 50× | 50 | 2.76 ppb |
| Concentration average | R2015-00003 Purified water 50× | 50 | 4.72 ppb |
| Concentration average | R2015-00003 Purified water 10× | 10 | 5.18 ppb |
| Concentration average | R2015-00003 Purified water 10× | 10 | 6.24 ppb |
| Concentration average | R2015-00003 Purified water 1× | 1 | 25.37 ppb |
| Concentration average | R2015-00003 Purified water 1× | 1 | 27.32 ppb |
| Concentration average | ATL water 040315 50× | 50 | 11.40 ppb |
| Concentration average | ATL water 040315 10× | 10 | 22.37 ppb |

| 1111 (KED) Value Unit | 23Na (KED) Value Unit | 24Mg (KED) Value Unit | 27Al (KED) Value Unit |
|---|---|---|---|
| 42.0 ppb | 14172 ppb | 9587 ppb | 5.76 ppb |
| 41.9 ppb | 13955 ppb | 9465 ppb | 5.61 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| 1111 (KED) Value Unit | 23Na (KED) Value Unit | 24Mg (KED) Value Unit | 27Al (KED) Value Unit |
|---|---|---|---|
| 71.4 ppb | 18131 ppb | 13443 ppb | −68.91 ppb |
| 289.7 ppb | 93595 ppb | 65310 ppb | −46.93 ppb |
| 58.1 ppb | 19061 ppb | 13195 ppb | −7.95 ppb |
| 56.6 ppb | 18995 ppb | 13246 ppb | −7.00 ppb |
| 42.0 ppb | 14172 ppb | 9587 ppb | 5.76 ppb |
| 41.9 ppb | 13955 ppb | 9465 ppb | 5.61 ppb |
| 192.1 ppb | 194825 ppb | 29544 ppb | −42.17 ppb |
| 151.5 ppb | 159358 ppb | 23602 ppb | −3.42 ppb |

| Sample List Category | Label | Dilution Factor | 29Si (KED) Value Unit |
|---|---|---|---|
| Concentration average | R2015-00003 Purified water 1× | 1 | 3572 ppb |
| Concentration average | R2015-00003 Purified water 1× | 1 | 3517 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| Sample List Category | Label | Dilution Factor | 29Si (KED) Value Unit |
|---|---|---|---|
| Concentration average | R2015-00003 Purified water 50× | 50 | 3897 ppb |
| Concentration average | R2015-00003 Purified water 50× | 50 | 22081 ppb |
| Concentration average | R2015-00003 Purified water 10× | 10 | 4497 ppb |
| Concentration average | R2015-00003 Purified water 10× | 10 | 4453 ppb |
| Concentration average | R2015-00003 Purified water 1× | 1 | 3572 ppb |
| Concentration average | R2015-00003 Purified water 1× | 1 | 3517 ppb |
| Concentration average | ATL water 040315 50× | 50 | 8633 ppb |
| Concentration average | ATL water 040315 10× | 10 | 7739 ppb |

| 39K (KED) Value Unit | 44Ca (KED) Value Unit | 45Sc (ICED) Value Unit | 48Ti (KED) Value Unit |
|---|---|---|---|
| 1316 ppb | 23109 ppb | 3.77 ppb | 49.4 ppb |
| 1292 ppb | 22595 ppb | 4.06 ppb | 49.6 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| 39K (KED) Value Unit | 44Ca (KED) Value Unit | 45Sc (ICED) Value Unit | 48Ti (KED) Value Unit |
|---|---|---|---|
| 1686 ppb | 31467 ppb | 0.778 ppb | 48.1 ppb |
| 8779 ppb | 155474 ppb | 1.597 ppb | 247.0 ppb |
| 1788 ppb | 31592 ppb | 2.747 ppb | 49.7 ppb |
| 1780 ppb | 31547 ppb | 3.561 ppb | 49.8 ppb |
| 1316 ppb | 23109 ppb | 3.771 ppb | 49.4 ppb |
| 1292 ppb | 22592 ppb | 4.059 ppb | 49.4 ppb |

TABLE 1-continued

Purified Fracking Water Analysis
Advanced Technology Laboratory ICP-MS

Analysis Request #R2015-00003  Rochelle Castaneda
Advanced Green Innovations  Brett Strawbridge All values are in whole-number parts per billion or at least three significant figures where the values are less than 100 ppb

| | | | |
|---|---|---|---|
| 5321 ppb | 86570 ppb | 7.194 ppb | 134.0 ppb |
| 4285 ppb | 70473 ppb | 5.5635 ppb | 134.3 ppb |

| Sample List Category | Label | Dilution Factor | 52Cr(KED) Value Unit |
|---|---|---|---|
| Concentration average | R2015-00003 Purified water 1× | 1 | 0.0509 ppb |
| Concentration average | R2015-00003 Purified water 1× | 1 | 0.0495 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| | | | |
|---|---|---|---|
| Concentration average | R2015-00003 Purified water 50× | 50 | 0.3571 ppb |
| Concentration average | R2015-00003 Purified water 50× | 50 | 0.4687 ppb |
| Concentration average | R2015-00003 Purified water 10× | 10 | 0.2341 ppb |
| Concentration average | R2015-00003 Purified water 10× | 10 | 0.3088 ppb |
| Concentration average | R2015-00003 Purified water 1× | 1 | 0.0509 ppb |
| Concentration average | R2015-00003 Purified water 1× | 1 | 0.0495 ppb |
| Concentration average | ATL water 040315 50× | 50 | 6.8033 ppb |
| Concentration average | ATL water 040315 10× | 10 | 6.1703 ppb |

| 55Mn (KED) Value Unit | 57Fe (KED) Value Unit | 60Ni (KED) Value Unit | 63Cu (KED) Value Unit |
|---|---|---|---|
| 2.82 ppb | 32.8 ppb | 0.211 ppb | 5.65 ppb |
| 2.76 ppb | 32.9 ppb | 0.370 ppb | 5.65 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| | | | |
|---|---|---|---|
| 4.784 ppb | 151.84 ppb | 12.049 ppb | 34.24 ppb |
| 14.409 ppb | 128.86 ppb | 2.109 ppb | 48.95 ppb |
| 2.926 ppb | 26.98 ppb | 0.808 ppb | 10.05 ppb |
| 2.890 ppb | 26.85 ppb | 0.969 ppb | 10.08 ppb |
| 2.817 ppb | 32.82 ppb | 0.211 ppb | 5.65 ppb |
| 2.756 ppb | 32.93 ppb | 0.370 ppb | 5.65 ppb |
| 0.822 ppb | −15.10 ppb | 17.394 ppb | 674.41 ppb |
| 0.437 ppb | 2.89 ppb | 10.356 ppb | 588.03 ppb |

| Sample List Category | Label | Dilution Factor | 66Zn (KED) Value Unit |
|---|---|---|---|
| Concentration average | R2015-00003 Purified water 1× | 1 | 353 ppb |
| Concentration average | R2015-00003 Purified water 1× | 1 | 353 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| | | | |
|---|---|---|---|
| Concentration average | R2015-00003 Purified water 50× | 50 | 421 ppb |
| Concentration average | R2015-00003 Purified water 50× | 50 | 2014 ppb |
| Concentration average | R2015-00003 Purified water 10× | 10 | 401 ppb |
| Concentration average | R2015-00003 Purified water 10× | 10 | 400 ppb |
| Concentration average | R2015-00003 Purified water 1× | 1 | 353 ppb |
| Concentration average | R2015-00003 Purified water 1× | 1 | 353 ppb |
| Concentration average | ATL water 040315 50× | 50 | 276 ppb |
| Concentration average | ATL water 040315 10× | 10 | 250 ppb |

| 75As (KED) Value Unit | 77Se (KED) Value Unit | 79Br (KED) Value Unit | 82Se (KED) Value Unit |
|---|---|---|---|
| 0.00298 ppb | 0.0002535 ppb | 0.557 ppb | 0.00416 ppb |
| 0.00314 ppb | 0.0000318 ppb | 0.587 ppb | 0.00455 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| | | | |
|---|---|---|---|
| 0.00835 ppb | 0.0000000 ppb | 0.623 ppb | 0.10817 ppb |
| 0.01604 ppb | 0.0016555 ppb | 2.869 ppb | 0.09386 ppb |
| 0.00324 ppb | 0.0009759 ppb | 0.588 ppb | 0.02231 ppb |
| 0.00362 ppb | 0.0012728 ppb | 0.599 ppb | 0.01881 ppb |
| 0.00298 ppb | 0.0002535 ppb | 0.557 ppb | 0.00416 ppb |

TABLE 1-continued

Purified Fracking Water Analysis
Advanced Technology Laboratory ICP-MS

| Analysis Request #R2015-00003 | | | Rochelle Castaneda |
|---|---|---|---|
| Advanced Green Innovations | | | Brett Strawbridge |

All values are in whole-number parts per billion or at least three significant figures where the values are less than 100 ppb

| 0.00314 ppb | 0.0000318 ppb | 0.587 ppb | 0.00455 ppb |
|---|---|---|---|
| 0.20188 ppb | 0.0239577 ppb | 4.798 ppb | 0.15787 ppb |
| 0.19620 ppb | 0.0224852 ppb | 2.909 ppb | 0.06965 ppb |

| Sample List Category | Label | Dilution Factor | 95Mo (KED) Value Unit |
|---|---|---|---|
| Concentration average | R2015-00003 Purified water 1× | 1 | 1.25 ppb |
| Concentration average | R2015-00003 Purified water 1× | 1 | 1.24 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| Concentration average | R2015-00003 Purified water 50× | 50 | 33.56 ppb |
|---|---|---|---|
| Concentration average | R2015-00003 Purified water 50× | 50 | 29.06 ppb |
| Concentration average | R2015-00003 Purified water 10× | 10 | 4.89 ppb |
| Concentration average | R2015-00003 Purified water 10× | 10 | 4.28 ppb |
| Concentration average | R2015-00003 Purified water 1× | 1 | 1.25 ppb |
| Concentration average | R2015-00003 Purified water 1× | 1 | 1.24 ppb |
| Concentration average | ATL water 040315 50× | 50 | 11.82 ppb |
| Concentration average | ATL water 040315 10× | 10 | 3.37 ppb |

| 111Cd (KED) Value Unit | 127I (KED) Value Unit | 137Ba (KED) Value Unit | 202Hg (KED) Value Unit |
|---|---|---|---|
| 0.0602 ppb | 0.591 ppb | 36.6 ppb | 0.00763 ppb |
| 0.0592 ppb | 0.609 ppb | 36.6 ppb | 0.00765 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| 0.1404 ppb | 1.470 ppb | 36.1 ppb | 0.10242 ppb |
|---|---|---|---|
| 0.3482 ppb | 4.056 ppb | 189.8 ppb | 0.11858 ppb |
| 0.0763 ppb | 0.800 ppb | 37.7 ppb | 0.02428 ppb |
| 0.0736 ppb | 0.824 ppb | 37.5 ppb | 0.02455 ppb |
| 0.0602 ppb | 0.591 ppb | 36.6 ppb | 0.00736 ppb |
| 0.0592 ppb | 0.609 ppb | 36.6 ppb | 0.00765 ppb |
| 0.1270 ppb | 3.188 ppb | 78.6 ppb | 0.09946 ppb |
| 0.1026 ppb | 1.567 ppb | 80.4 ppb | 0.02439 ppb |

| Sample List Category | Label | Dilution Factor | 208Pb (ICED) Value Unit |
|---|---|---|---|
| Concentration average | R2015-00003 Purified water 1× | 1 | 1.03 ppb |
| Concentration average | R2015-00003 Purified water 1× | 1 | 1.04 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| Concentration average | R2015-00003 Purified water 50× | 50 | 34.62 ppb |
|---|---|---|---|
| Concentration average | R2015-00003 Purified water 50× | 50 | 12.05 ppb |
| Concentration average | R2015-00003 Purified water 10× | 10 | 2.46 ppb |
| Concentration average | R2015-00003 Purified water 10× | 10 | 2.46 ppb |
| Concentration average | R2015-00003 Purified water 1× | 1 | 1.03 ppb |
| Concentration average | R2015-00003 Purified water 1× | 1 | 1.04 ppb |
| Concentration average | ATL water 040315 50× | 50 | 11.84 ppb |
| Concentration average | ATL water 040315 10× | 10 | 3.04 ppb |

| 238U (KED) Value Unit |
|---|
| 0.377 ppb |
| 0.377 ppb |

TWO RUNS FOR EACH SAMPLE TYPE, EACH IS THE AVERAGE OF THREE ITERATIVE SAMPLINGS
Below are comparisons to more dilute solutions of the purified water and tap-water from Advanced Technology Laboratory (ATL)

| 0.524 ppb |
|---|
| 2.114 ppb |
| 0.414 ppb |
| 0.413 ppb |

TABLE 1-continued

Purified Fracking Water Analysis
Advanced Technology Laboratory ICP-MS

Analysis Request #R2015-00003  Rochelle Castaneda
Advanced Green Innovations  Brett Strawbridge All values are in whole-number parts per billion or at least three significant figures where the values are less than 100 ppb 0.377 ppb
0.377 ppb
8.856 ppb
8.958 ppb

I claim:

1. A system of self-similar fractal stages for selectively removing elements, compounds, and particles from a flowable medium comprising:

a series of concatenated, self-similar fractal stages, characterized by magnification, for defining a flow path for directing the flowable medium through the fractal stages for developing fractal scaling of hydrodynamic flow and associated electric field interaction with the flowable medium at each successive fractal stage;

the self-similar fractal stages comprising an initiator stage having a selected geometric construction including a constriction means for defining the flow path and for accelerating hydrodynamic flow therethrough, and a plurality of concatenated scaled copies of the initiator stage, for recursive acceleration of hydrodynamic flow through each stage, such that a recursively magnified electro hydrodynamic effect at each stage charges particles in the flowable medium to a level sufficient to cause electron removal, breaking of molecular bonds, and particle separation out of the flowable medium.

2. A system as in claim 1 wherein the initiator stage has an input for receiving the flowable medium and square interior defining a flow path, angled constriction for accelerating the flowable medium through the flow path, and an output connected to an input of a succession of the concatenated, self-similar fractal stages, each successive self-similar fractal stage being a scaled copy of the initiator stage characterized by magnification.

3. A system as in claim 1 wherein each self-similar fractal stage defining the flowpath of flowable medium further comprises a square having angled sides for providing electric charge interaction and self-selection of atoms, ions, molecules, and particles suspended in the flowable medium at each stage, such that atoms, ions, molecules, and particles are selectively aggregated and separated from the flowpath by a specific electro hydrodynamic field signature occurring at each successive fractal stage.

4. A system as in claim 3, wherein each self similar fractal stage is a scaled copy of the initiator stage determined by a fractal scaling rule equal to $\tilde{\omega}$, Phi=1.168.

5. A system as in claim 4 wherein all fractal stages are adapted for integration on a trailer capable of being towed by a truck for mobile application.

6. A system as in claim 5 wherein the input of the initiator stage of a mobile unit is connected to a subsurface conduit drilled horizontally underneath a permeable seabed, such that water from the ocean or brackish body of water is provided directly to the input of the mobile unit at a distance up to four miles from the shore of the body of ocean or brackish water.

7. A system as in claim 6 further comprising a continuous flow resin system connected for receiving the output of all concatenated self-similar fractal stages, such that anion and cation resins flow alternately in a continuous flow configuration over and against the flow of output water from the fractal stages.

* * * * *